(12) United States Patent
Furui et al.

(10) Patent No.: US 11,360,404 B2
(45) Date of Patent: Jun. 14, 2022

(54) TONER AND METHOD FOR PRODUCING TONER

(71) Applicant: CANON KABUSHIKI KAISHA, Tokyo (JP)

(72) Inventors: Takaaki Furui, Tokyo (JP); Yojiro Hotta, Mishima (JP); Yasuhiro Hashimoto, Mishima (JP); Koji Nishikawa, Susono (JP); Shotaro Nomura, Suntou-gun (JP); Yuujirou Nagashima, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 16/728,171

(22) Filed: Dec. 27, 2019

(65) Prior Publication Data

US 2020/0209768 A1 Jul. 2, 2020

(30) Foreign Application Priority Data

Dec. 28, 2018 (JP) .............................. JP2018-247083

(51) Int. Cl.
  *G03G 9/097* (2006.01)
  *G03G 9/08* (2006.01)
  *C08G 77/04* (2006.01)
  *C08J 7/12* (2006.01)

(52) U.S. Cl.
  CPC ......... *G03G 9/0825* (2013.01); *C08G 77/045* (2013.01); *C08J 7/123* (2013.01); *G03G 9/0815* (2013.01); *G03G 9/0819* (2013.01); *C08J 2383/04* (2013.01)

(58) Field of Classification Search
  CPC ..................... G03G 9/09708; G03G 9/09725
  See application file for complete search history.

(56) References Cited

U.S. PATENT DOCUMENTS

| 5,601,913 | A | 2/1997 | Ohtani et al. |
| 6,528,222 | B2 | 3/2003 | Kohtaki et al. |
| 6,586,147 | B2 | 7/2003 | Iida et al. |

(Continued)

FOREIGN PATENT DOCUMENTS

| EP | 0 430 076 | 6/1991 |
| EP | 2 669 740 | 12/2013 |

(Continued)

OTHER PUBLICATIONS

Translation of JP 2006-201533.*

(Continued)

*Primary Examiner* — Peter L Vajda
(74) *Attorney, Agent, or Firm* — Venable LLP

(57) ABSTRACT

A toner comprising a toner particle that contains a binder resin and fine particles A at the surface of the toner particle, wherein the fine particles A are organosilicon polymer fine particles, the organosilicon polymer fine particles have a number-average primary particle diameter of 30 nm to 500 nm, the organosilicon polymer fine particles have an attachment index for a polycarbonate film of not more than 3.5, the organosilicon polymer fine particles penetrate into the toner particle in a penetration depth b (nm), and protrude from the toner particle in a protrusion height c (nm), and b and c satisfy $0.05 \leq b/(b+c) \leq 0.40$.

10 Claims, 3 Drawing Sheets

(56) References Cited

U.S. PATENT DOCUMENTS

| | | | |
|---|---|---|---|
| 6,751,424 B2 | 6/2004 | Komatsu et al. | |
| 6,808,852 B2 | 10/2004 | Hotta et al. | |
| 6,929,894 B2 | 8/2005 | Sugahara et al. | |
| 7,112,393 B2 | 9/2006 | Komoto et al. | |
| 7,115,349 B2 | 10/2006 | Iida et al. | |
| 7,147,980 B2 | 12/2006 | Itakura et al. | |
| 7,273,686 B2 | 9/2007 | Onuma et al. | |
| 7,288,354 B2 | 10/2007 | Moribe et al. | |
| 7,306,889 B2 | 12/2007 | Okubo et al. | |
| 7,351,509 B2 | 4/2008 | Moribe et al. | |
| 7,422,832 B2 | 9/2008 | Ogawa et al. | |
| 7,455,947 B2 | 11/2008 | Ida et al. | |
| 7,459,253 B2 | 12/2008 | Abe et al. | |
| 7,544,457 B2 | 6/2009 | Hashimoto et al. | |
| 7,582,401 B2 | 9/2009 | Ogawa et al. | |
| 7,629,100 B2 | 12/2009 | Okamoto et al. | |
| 7,745,089 B2 | 6/2010 | Okubo et al. | |
| 7,816,063 B2 | 10/2010 | Hashimoto et al. | |
| 8,053,156 B2 | 11/2011 | Abe et al. | |
| 8,114,562 B2 | 2/2012 | Ishigami et al. | |
| 8,227,162 B2 | 7/2012 | Sano et al. | |
| 8,247,147 B2 | 8/2012 | Abe et al. | |
| 8,367,289 B2 | 2/2013 | Isono et al. | |
| 8,426,094 B2 | 4/2013 | Magome et al. | |
| 8,440,382 B2 | 5/2013 | Osono et al. | |
| 8,497,054 B2 | 7/2013 | Sugiyama et al. | |
| 8,614,044 B2 | 12/2013 | Matsui et al. | |
| 8,652,737 B2 | 2/2014 | Handa et al. | |
| 8,778,581 B2 | 7/2014 | Nonaka et al. | |
| 8,778,585 B2 | 7/2014 | Matsui et al. | |
| 8,883,389 B2 | 11/2014 | Matsui et al. | |
| 8,916,319 B2 | 12/2014 | Ikeda et al. | |
| 8,927,188 B2 | 1/2015 | Naka et al. | |
| 8,940,467 B2 | 1/2015 | Hashimoto et al. | |
| 9,040,216 B2 | 5/2015 | Fukudome et al. | |
| 9,046,800 B2 | 6/2015 | Hotta et al. | |
| 9,097,997 B2 | 8/2015 | Nomura et al. | |
| 9,116,448 B2 | 8/2015 | Terauchi et al. | |
| 9,134,637 B2 | 9/2015 | Hotta et al. | |
| 9,141,012 B2 | 9/2015 | Moribe et al. | |
| 9,201,323 B2 | 12/2015 | Nishikawa et al. | |
| 9,213,250 B2 | 12/2015 | Nomura et al. | |
| 9,217,943 B2 | 12/2015 | Matsui et al. | |
| 9,229,345 B2 | 1/2016 | Ikeda et al. | |
| 9,250,548 B2 | 2/2016 | Nomura et al. | |
| 9,261,804 B2 | 2/2016 | Yamazaki et al. | |
| 9,341,970 B2 | 5/2016 | Yoshiba et al. | |
| 9,423,714 B2 | 8/2016 | Kenmoku et al. | |
| 9,470,993 B2 | 10/2016 | Nishikawa et al. | |
| 9,575,425 B2 | 2/2017 | Naka et al. | |
| 9,588,450 B2 | 3/2017 | Tsuda et al. | |
| 9,606,462 B2 | 3/2017 | Nomura et al. | |
| 9,715,188 B2 | 7/2017 | Terauchi et al. | |
| 9,772,570 B2 | 9/2017 | Tsuda et al. | |
| 9,778,583 B2 | 10/2017 | Terauchi et al. | |
| 9,804,514 B2 | 10/2017 | Suzumura et al. | |
| 9,829,818 B2 | 11/2017 | Yoshiba et al. | |
| 9,841,692 B2 | 12/2017 | Hasegawa et al. | |
| 9,897,932 B2 | 2/2018 | Hotta et al. | |
| 9,964,874 B2 | 5/2018 | Suzumura et al. | |
| 9,971,263 B2 | 5/2018 | Fukudome et al. | |
| 10,012,919 B2 | 7/2018 | Matsui et al. | |
| 10,101,683 B2 | 10/2018 | Nishikawa et al. | |
| 10,156,800 B2 | 12/2018 | Tsuda et al. | |
| 10,197,934 B2 | 2/2019 | Matsui et al. | |
| 10,228,627 B2 | 3/2019 | Nagashima et al. | |
| 10,228,630 B2 | 3/2019 | Mizuguchi et al. | |
| 10,241,430 B2 | 3/2019 | Kumura et al. | |
| 10,289,016 B2 | 5/2019 | Fukudome et al. | |
| 10,295,920 B2 | 5/2019 | Nishikawa et al. | |
| 10,295,921 B2 | 5/2019 | Ohmori et al. | |
| 10,303,075 B2 | 5/2019 | Tanaka et al. | |
| 10,310,397 B2 | 6/2019 | Sano et al. | |
| 2004/0058258 A1 | 3/2004 | Yoshino et al. | |
| 2004/0137356 A1 | 7/2004 | Tomita et al. | |
| 2008/0226998 A1 | 9/2008 | Ishii et al. | |
| 2009/0117477 A1 | 5/2009 | Magome et al. | |
| 2009/0155706 A1 | 6/2009 | Shu et al. | |
| 2010/0248110 A1 | 9/2010 | Taguchi et al. | |
| 2014/0220488 A1 | 8/2014 | Hosoya et al. | |
| 2015/0125790 A1 | 5/2015 | Hotta et al. | |
| 2015/0220013 A1 | 8/2015 | Nishikawa et al. | |
| 2016/0139522 A1 | 5/2016 | Yoshiba et al. | |
| 2016/0161874 A1 | 6/2016 | Yamazaki et al. | |
| 2016/0187799 A1 | 6/2016 | Hiroshi et al. | |
| 2016/0299446 A1 | 10/2016 | Kuroki et al. | |
| 2016/0378003 A1 | 12/2016 | Arimura et al. | |
| 2017/0219947 A1 | 8/2017 | Omori et al. | |
| 2017/0329246 A1 | 11/2017 | Yamawaki et al. | |
| 2018/0275540 A1* | 9/2018 | Matsuo | G03G 9/0815 |
| 2018/0329323 A1 | 11/2018 | Kimura et al. | |
| 2018/0329324 A1 | 11/2018 | Kamikura et al. | |
| 2018/0329327 A1 | 11/2018 | Yamawaki et al. | |
| 2018/0329329 A1 | 11/2018 | Nakamura et al. | |
| 2019/0235402 A1 | 8/2019 | Inoue et al. | |

FOREIGN PATENT DOCUMENTS

| | | | |
|---|---|---|---|
| EP | 2 818 932 | 12/2014 | |
| EP | 2 853 945 | 4/2015 | |
| EP | 2 860 585 | 4/2015 | |
| EP | 3 095 805 | 11/2016 | |
| EP | 3 480 661 | 5/2019 | |
| EP | 3 480 661 A1 * | 5/2019 | ............... G03G 9/08 |
| EP | 19219784.6 | 4/2020 | |
| EP | 19219785.3 | 4/2020 | |
| EP | 19219786.1 | 4/2020 | |
| EP | 19219787.9 | 4/2020 | |
| EP | 19219788.7 | 4/2020 | |
| EP | 19219789.5 | 4/2020 | |
| EP | 19219790.3 | 4/2020 | |
| EP | 19219791.1 | 4/2020 | |
| EP | 19219792.9 | 4/2020 | |
| JP | H04-050859 | 2/1992 | |
| JP | 2006-201533 * | 3/2006 | ............... G03G 9/08 |
| JP | 2017-122873 | 7/2017 | |
| WO | 2018/003749 | 1/2018 | |

OTHER PUBLICATIONS

U.S. Appl. No. 16/728,050, Tsuneyoshi Tominaga, filed Dec. 27, 2019.
U.S. Appl. No. 16/728,060, Kentaro Yamawaki, filed Dec. 27, 2019.
U.S. Appl. No. 16/728,082, Yasuhiro Hashimoto, filed Dec. 27, 2019.
U.S. Appl. No. 16/728,101, Taiji Katsura, filed Dec. 27, 2019.
U.S. Appl. No. 16/728,115, Shotaru Nomura, filed Dec. 27, 2019.
U.S. Appl. No. 16/728,122, Masamichi Sato, filed Dec. 27, 2019.
U.S. Appl. No. 16/728,151, Masatake Tanaka, filed Dec. 27, 2019.
U.S. Appl. No. 16/728,157, Shohei Kototani, filed Dec. 27, 2019.
U.S. Appl. No. 16/728,179, Koji Nishikawa, filed Dec. 27, 2019.
U.S. Appl. No. 16/701,260, Koji Nishikawa, filed Dec. 3, 2019.
U.S. Appl. No. 16/701,292, Tetsuya Kinumatsu, filed Dec. 3, 2019.
U.S. Appl. No. 16/701,412, Kosuke Fukudome, filed Dec. 3, 2019.

* cited by examiner

TONER AND METHOD FOR PRODUCING TONER

BACKGROUND OF THE INVENTION

Field of the Invention

The present invention relates to the toner used in image-forming methods such as, e.g., electrophotography.

Description of the Related Art

Higher image quality levels and a longer life are being required of electrophotography-based image-forming devices, and, in order to respond to these demands, additional improvements in various properties are also being required of toner. In particular with regard to toner, obtaining a suitable toner flowability, which will bring about, e.g., an improved charging uniformity by the toner and an improved coating performance by the toner at the developing roller of the developing device, is required in order to achieve higher image quality levels, and the retention of such a flowability on a long-term basis is also required. In particular, at toner end-of-life, toner flowability is crucial during a restart after an electrophotography-based image-forming device has been stopped for an extended period of time.

The reason for this is that during an extended stoppage, due to the force of gravity the toner assumes a more densely packed state than during continuous operation and the toner flowability is then restrained; a high flowability is thus required in order to maintain a high image quality and in particular to maintain a high image density.

The external addition of inorganic fine particles, e.g., small-diameter silica, has generally been conventionally used to reduce toner adherence in order to increase toner flowability. In addition, the external addition of organosilicon polymer fine particles has also been carried out as a method that supports the long-term retention of flowability. However, when the toner flowability is increased to the point that a fully satisfactory image density is obtained upon operation after an extended stoppage, the toner flowability during continuous operation is then too high, the number of times of rubbing with the charging member is increased, and the frequency of overcharged toner is increased. During development, this overcharged toner ends up scattering into nonimage areas around the image area, and the production of negative effects on the image during continuous operation has thus been a problem. These negative effects on the image are hereafter referred to as scattering.

Japanese Patent Application Publication No. H04-50859 proposes that toner flowability be maintained through the attachment or embedding of spherical resin fine particles comprising an organosilicon polymer.

Japanese Patent Application Publication No. 2017-122873 proposes that the flowability be maintained through the external addition of polyorganosilsequioxane fine particles having a number-average particle diameter of from 10 nm to less than 100 nm.

A certain effect is recognized for this art with regard to maintaining toner flowability during long-term durability testing.

SUMMARY OF THE INVENTION

However, there is still room for further investigations into the coexistence of a suppression of scattering during continuous operation while securing a toner flowability that can achieve a high image quality even upon a restart after an extended stoppage.

An object of the present invention is to provide a toner that solves the problem indicated above. Specifically, an object is to provide a toner that, through a strong attachment to the toner, without being embedded beyond a certain degree, of organosilicon polymer fine particles (hereafter referred to as particles A) having a number-average primary particle diameter of 30 nm to 500 nm, can resist scattering of the toner during continuous operation while securing sufficient toner flowability to be able to maintain the image density even after extended stoppage even at toner end-of-life.

According to the present invention, following toner can be provided;
a toner comprising:
a toner particle that contains a binder resin and
fine particles A at a surface of the toner particle,
wherein:
the fine particles A are organosilicon polymer fine particles;
the organosilicon polymer fine particles have a number-average primary particle diameter of 30 nm to 500 nm;
the organosilicon polymer fine particles have an attachment index for a polycarbonate film, as given by the following formula (I), of not more than 3.5; and $$\text{Attachment index} = (\text{Area ratio } [A] \text{ for the organosilicon polymer fine particles transferred to the polycarbonate film})/(\text{Coverage ratio } [B] \text{ of the surface of the toner particle by the organosilicon polymer fine particles}) \times 100 \quad (I)$$

and wherein
when an expansion image of the toner is obtained by the following steps (i) to (iii):
(i) obtaining a cross sectional image of the toner with a transmission electron microscope;
(ii) in the cross sectional image, determining a line along a perimeter of the surface of the toner particle; and
(iii) obtaining an expansion image of the cross sectional image by expanding the line determined in the step (ii) into a straight line,
in the expansion image,
the organosilicon polymer fine particles penetrate into the toner particle in a penetration depth b (nm), and protrude from the toner particle in a protrusion height c (nm), and b and c satisfy the following formula (II):

$$0.05 \leq b/(b+c) \leq 0.40 \quad (II).$$

Moreover, according to the present invention, following toner production method can be provided;
a method for producing a toner, having a step of treating a mixture that contains a binder resin-containing toner particle and fine particles A, wherein:
the fine particles A are organosilicon polymer fine particles and the organosilicon polymer fine particles have a number-average primary particle diameter of 30 nm to 500 nm;
the aforementioned step comprises a heating step of subjecting the mixture to a heated mixing treatment;
the following formula (III) is satisfied where $T_R$ (° C.) is the temperature in the heating step and Tg (° C.) is the glass transition temperature of the toner particle; and
the following formula (IV) is satisfied where E (W·h/g) is the mixing treatment energy in the heating step.

$$Tg-10(° C.) \leq T_R \leq Tg+10(° C.) \quad (III)$$

$$1.0 \times 10^{-4} (W \cdot h/g) \leq E \leq 1.0 \times 10^{-1} (W \cdot h/g) \quad (IV)$$

According to the present invention, the toner, which can resist scattering of the toner during continuous operation while securing sufficient toner flowability to be able to maintain the image density even after extended stoppage even at toner end-of-life, can be provided.

Further features of the present invention will become apparent from the following description of exemplary embodiments with reference to the attached drawings.

DESCRIPTION OF THE EMBODIMENTS

Figure 1:
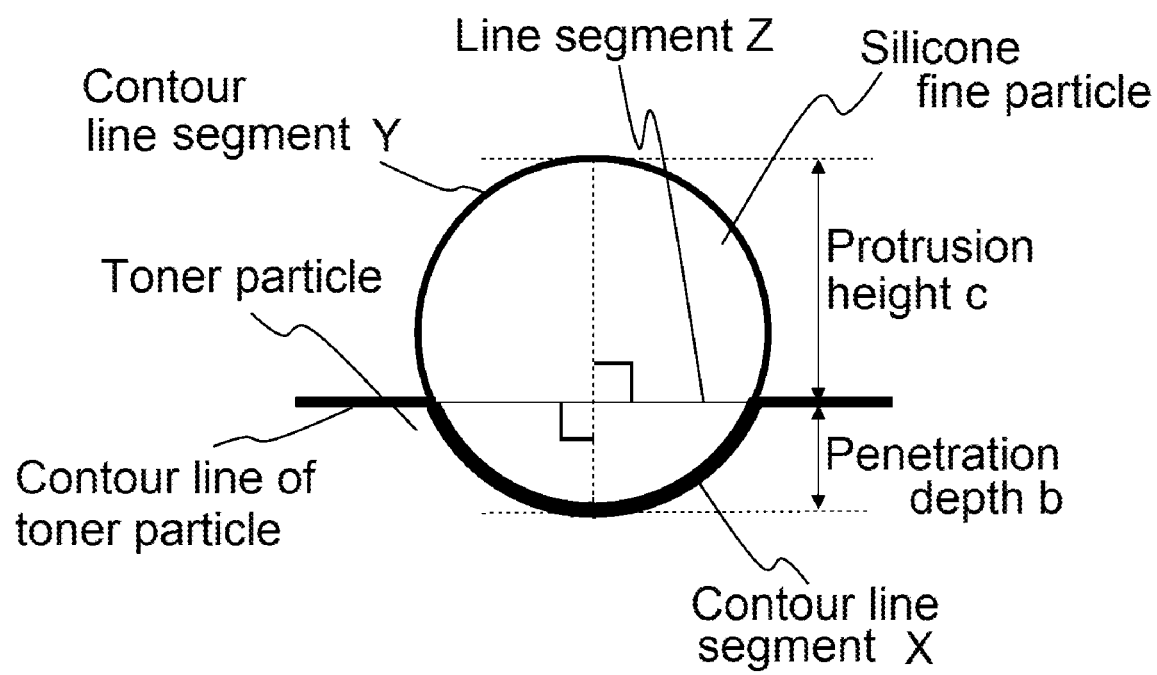
FIG. 1 is a schematic diagram that shows a method for calculating the penetration depth of an organosilicon polymer fine particle.

As previously noted, a factor in the reduction of the image density after an extended stoppage is that the toner becomes packed due to the force of gravity during an extended stoppage and assumes a state in which the toner particle-to-toner particle distance is closer than in continuous operation. As a consequence, a high toner-to-toner attachment force occurs and toner flow is impaired.

Given this, mobilization can be gradually achieved by stirring the toner and the flowability can be recovered; however, time is required until recovery is achieved. Thus, raising the toner flowability and thereby facilitating mobilization in advance is effective for maintaining the image density from immediately after an extended stoppage at toner end-of-life.

However, when the toner flowability is increased enough to achieve maintenance of the image density from immediately after an extended stoppage, the toner flowability is then too high for continuous operation. In this case, overcharged toner particles are produced at high frequencies and the toner is scattered into nonimage areas during development and the production of image defects typified by scattering is facilitated.

The present inventors thus sought a method that, even at toner end-of-life, could suppress toner scattering during development while increasing the flowability, and particularly the ease of mobilization, after an extended stoppage.

With regard to a method for increasing the ease of mobilization after an extended stoppage, the present inventors focused on the charging characteristics and elastic recovery force possessed by organosilicon polymer fine particles used as an external additive. This elastic recovery force refers to a behavior whereby deformation occurs upon the application of external force within the cartridge, but restoration occurs without the appearance of plastic deformation when the external force is removed.

Organosilicon polymers have a lower hardness than common inorganic materials and are elastic materials, and as a consequence, while they undergo a large deformation when subjected to external force, they can recover their original shape when the external force is removed. It is thought that by using fine particles thereof as an external additive, even when toner packing has progressed after an extended stoppage, the fine particles undergo a large deformation when an external force is applied at restart and a toner-to-toner rebound force then acts when the original shape is subsequently recovered. It was thought that this rebound force would facilitate mobilization to a greater degree than high-hardness inorganic fine particles.

In total, then, it is thought that, with organosilicon polymer fine particles, flowability can be obtained due to a high release performance, unlike other resin fine particles having a high elastic recovery, and the charging performance can also be satisfied at the same time due to facile triboelectric charging.

However, the image density in the case of restart after an extended stoppage was not improved even when these fine particles were externally added. When external force was applied to toner to which these fine particles had been externally added and the toner was then submitted to detailed observations, the organosilicon polymer fine particles were found to have migrated from the toner particle surface. This migration means that the external additive has transferred from a toner particle to a different toner particle or to a cartridge member. Based on this, it was thought that the inadequate action of the toner-to-toner rebound force brought about by elastic recovery after the application of external force might be due to the migration of the organosilicon polymer fine particles from the toner.

The present inventors therefore raised the attachment performance of the organosilicon polymer fine particles to the toner particle. As a result, a facilitating effect could be obtained for toner mobilization when the packed toner received an external force. Moreover, based on the relationship between the hardnesses of the organosilicon polymer fine particle and the toner, embedding of these fine particles in the toner particle could be suppressed and changes in the image density due to durability testing could also be suppressed.

However, these features alone, while being able to maintain the image density after an extended stoppage, were not able to satisfactorily suppress toner scattering in the developing section during continuous operation. The present inventors therefore sought a method that could achieve a greater suppression of toner scattering during development.

The present inventors ascertained that toner scattering is caused by an excessive rubbing during triboelectric charging of toner that has an overincreased flowability, and based on this the present inventors focused on toner behavior during development. It was found that in the interval from triboelectric charging to development the toner particles are coated in a thin layer and that the toner itself undergoes rotation. It was therefore thought that if the toner itself were rotating with the toner in a dense state and if organosilicon polymer fine particles of prescribed particle diameter were to form protrusions from the toner particle surface, a condition could then be created in which toner-to-toner intermeshing occurs and toner scattering could be suppressed.

As a result of their investigations, the present inventors discovered that scattering during development can be suppressed by increasing the strength of attachment to the toner particle of organosilicon polymer fine particles having a prescribed particle diameter, without embedding these fine particles in the toner particle beyond a certain degree.

Based on this perspective, it was discovered that, through a strong attachment to the toner particle, without being embedded beyond a certain degree, of organosilicon polymer fine particles having a prescribed particle diameter, scattering during continuous operation can be suppressed while securing the image density even after extended stoppage even at toner end-of-life. The present invention was achieved based on this discovery.

Specifically, the toner of the present invention is a toner comprising:
a toner comprising:
a toner particle that contains a binder resin and fine particles A at a surface of the toner particle,
wherein:
the fine particles A are organosilicon polymer fine particles;
the organosilicon polymer fine particles have a number-average primary particle diameter of 30 nm to 500 nm;
the organosilicon polymer fine particles have an attachment index for a polycarbonate film, as given by the following formula (I), of not more than 3.5; and $$\text{Attachment index} = (\text{Area ratio } [A] \text{ for the organosilicon polymer fine particles transferred to the polycarbonate film})/(\text{Coverage ratio } [B] \text{ of the surface of the toner particle by the organosilicon polymer fine particles}) \times 100 \quad (I)$$

and wherein
when an expansion image of the toner is obtained by the following steps (i) to (iii):
(i) obtaining a cross sectional image of the toner with a transmission electron microscope;
(ii) in the cross sectional image, determining a line along a perimeter of the surface of the toner particle; and
(iii) obtaining an expansion image of the cross sectional image by expanding the line determined in the step (ii) into a straight line,
in the expansion image,
the organosilicon polymer fine particles penetrate into the toner particle in a penetration depth b (nm), and protrude from the toner particle in a protrusion height c (nm), and b and c satisfy the following formula (II):

$$0.05 \leq b/(b+c) \leq 0.40 \quad (II).$$

The fine particles A are organosilicon polymer fine particles, and these organosilicon polymer fine particles have a number-average primary particle diameter of 30 nm to 500 nm. The organosilicon polymer fine particles preferably have a number-average particle diameter of 50 nm to 150 nm and more preferably 50 nm to 120 nm.

When the organosilicon polymer fine particles have a number-average primary particle diameter of less than 30 nm, the intermeshing effect between organosilicon polymer fine particles is not obtained and scattering during development cannot be suppressed. When the organosilicon polymer fine particles have a number-average primary particle diameter of exceeds 500 nm, the amount of deformation upon exposure to external force is then small and facile mobilization of the toner due to the elastic recovery when external force has been applied cannot be obtained.

Both of the effects, i.e., suppression of scattering during development and elastic recovery when external force has been applied, are obtained to a greater degree when the organosilicon polymer fine particles have a number-average primary particle diameter of 50 nm to 150 nm.

The organosilicon polymer fine particles have an attachment index for a polycarbonate film, as defined by the following formula (I), of not more than 3.5.

$$\text{Attachment index} = (\text{Area ratio } [A] \text{ for the organosilicon polymer fine particles transferred to the polycarbonate film})/(\text{Coverage ratio } [B] \text{ of the surface of the toner particle by the organosilicon polymer fine particles}) \times 100 \quad (I)$$

The attachment index is preferably not more than 3.2 and is more preferably not more than 3.0. The attachment index is preferably equal to or greater than 0.0.

The attachment index is a value that indicates the ease of transfer of the organosilicon polymer fine particles versus a polycarbonate film, and smaller numerical values mean that the organosilicon polymer fine particles are more resistant to removal from the toner particle and are more resistant to transfer to another member. The attachment index can be controlled by changing the external addition conditions and by surface treatment of the organosilicon polymer fine particles.

When the attachment index exceeds 3.5, transfer of the organosilicon polymer fine particles when the toner in a dense state has received an external force cannot be suppressed, and the effect of easy mobilization due elastic recovery and the effect of a suppression of scattering by intermeshing between organosilicon polymer fine particles cannot be obtained.

When an expansion image of the toner, as shown in FIG. 1, is obtained by the following steps (i) to (iii):
(i) obtaining a cross sectional image of the toner with a transmission electron microscope;
(ii) in the cross sectional image, determining a line along a perimeter of the surface of the toner particle; and
(iii) obtaining an expansion image of the cross sectional image by expanding the line determined in the step (ii) into a straight line,
in the expansion image,
the organosilicon polymer fine particles penetrate into the toner particle in a penetration depth b (nm), and protrude from the toner particle in a protrusion height c (nm), and b and c satisfy the following formula (II):

$$0.05 \leq b/(b+c) \leq 0.40 \quad (II).$$

When $b/(b+c)$ is less than 0.05, the organosilicon polymer fine particle then has a high center of gravity and the overturning moment is large, and as a consequence, even when the attachment index is not more than 3.5, the organosilicon polymer fine particles are transferred by shear force when the organosilicon polymer fine particles are intermeshed and the scattering-inhibiting effect due to intermeshing cannot be obtained. When $b/(b+c)$ is greater than 0.40, sliding ends up occurring due to the curvature of the organosilicon polymer fine particles when the organosilicon polymer fine particles come into contact with each other, and the scattering-inhibiting effect cannot then be obtained.

$b/(b+c)$ is preferably 0.05 to 0.35 and more preferably 0.05 to 0.30. $b/(b+c)$ can be controlled by altering the external addition conditions.

The coverage ratio of the surface of the toner particle by the organosilicon polymer fine particles is preferably 5% to 50% and is more preferably from 5% to less than 50%. When the coverage ratio is in the indicated range, the generation of intermeshing between the organosilicon polymer fine particles is facilitated and obtaining the scattering-inhibiting effect is facilitated to an even greater degree. The coverage ratio can be controlled by altering the amount of addition of the organosilicon polymer fine particles and altering the conditions for the external addition of the organosilicon polymer fine particles.

The organosilicon polymer fine particles contain an organosilicon polymer. The organosilicon polymer is not particularly limited, but preferably has a structure in which the silicon atom and oxygen atom are bonded to each other in alternation. More preferably, a portion of silicon atoms in the organosilicon polymer has a T3 unit structure represented by $R^1SiO_{3/2}$. This $R^1$ is preferably a hydrocarbon group and is more preferably an alkyl group having 1 to 6

(preferably 1 to 3, more preferably 1 or 2, and still more preferably 1) carbons or a phenyl group.

The organosilicon polymer fine particles preferably contain an organosilicon polymer of at least 90 mass % based on the organosilicon polymer fine particles. The organosilicon polymer fine particles preferably contain an organosilicon polymer of not more than 100 mass % based on the organosilicon polymer fine particles.

The method for producing the organosilicon polymer fine particles is not particularly limited and production may be carried out by a known method. For example, production may be carried out by the dropwise addition of a silane compound to water and execution of hydrolysis and condensation reactions under catalysis, followed by filtration of the resulting suspension and drying. The number-average primary particle diameter of the organosilicon polymer fine particles can be controlled by judicious alteration of, for example, the type of catalyst, the blending ratio, the temperature at the start of the reaction, and the duration of dropwise addition.

The catalyst can be exemplified by acidic catalysts such as hydrochloric acid, hydrofluoric acid, sulfuric acid, and nitric acid, and by basic catalysts such as aqueous ammonia, sodium hydroxide, and potassium hydroxide, but there is no limitation to these.

The organosilicon compounds for production of the organosilicon polymer fine particles are described in the following.

The organosilicon polymer preferably is the condensation polymer of an organosilicon compound having the structure given by the following formula (2).

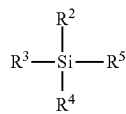

(2)

where $R^2$, $R^3$, $R^4$, and $R^5$ each independently represent an alkyl group having 1 to 6 carbons, a phenyl group, or a reactive group selected from the group consisting of halogen atoms, the hydroxy group, the acetoxy group, and alkoxy groups having preferably 1 to 6 (more preferably 1 to 3 and still more preferably 1 or 2) carbons, with the proviso that at least one of $R^2$, $R^3$, $R^4$, and $R^5$ represents the reactive group.

An organosilicon compound having four reactive groups in each formula (2) molecule (tetrafunctional silane), an organosilicon compound having in formula (2) an alkyl group or phenyl group for $R^2$ and three reactive groups ($R^3$, $R^4$, $R^5$) (trifunctional silane), an organosilicon compound having in formula (2) an alkyl group or phenyl group for $R^2$ and $R^3$ and two reactive groups ($R^4$, $R^5$) (difunctional silane), and an organosilicon compound having in formula (2) an alkyl group or phenyl group for $R^2$, $R^3$, and $R^4$ and one reactive group ($R^5$) (monofunctional silane) can be used to obtain the organosilicon polymer particles. The use of at least 50 mol % trifunctional silane for the organosilicon compound is preferred, and the use of at least 60 mol % trifunctional silane for the organosilicon compound is more preferred.

The organosilicon polymer particle can be obtained through the formation of a crosslinked structure provided by the hydrolysis, addition polymerization, and condensation polymerization of these reactive groups. The hydrolysis, addition polymerization, and condensation polymerization of $R^3$, $R^4$, and $R^5$ can be controlled using the reaction temperature, reaction time, reaction solvent, and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, phenyltrihydroxysilane, and pentyltrimethoxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

In addition, given W, X, Y, and Z as the numerical proportions of units derived from, respectively, tetrafunctional silane, trifunctional silane, difunctional silane, and monofunctional silane (with the proviso that W+X+Y+Z=1.00), X for the organosilicon polymer is preferably at least 0.90 and is more preferably 0.95 to 1.00.

In addition, with regard to the oxygen atoms bonded to an element Si that has taken on a trifunctional structure (T unit structure), an analysis was carried out of the number of these oxygen atoms to which the element Si is bonded. For the oxygen atoms bonded to an element Si that has taken on a trifunctional structure (T unit structure), and using the T1 unit structure to refer to the structure in which the number of said oxygen atoms bonded to the element Si other than the aforesaid element Si is 1, using the T2 unit structure to refer to the structure in which the number of said oxygen atoms bonded to the element Si other than the aforesaid element Si is 2, using the T3 unit structure to refer to the structure in which the number of said oxygen atoms bonded to the element Si other than the aforesaid element Si is 3, and using T1, T2, and T3 to respectively refer to their proportions, it was found that T2/T3 is preferably 0.20 to 0.60 and is more preferably 0.25 to 0.50.

The proportions W, X, Y, and Z and the proportions T1, T2, and T3 can be determined using $^{29}$Si-NMR measurement and the peak areas with reference to the total area for all peaks originating with the element silicon.

The storage elastic modulus E' of the toner at 30° C. as obtained by a powder dynamic viscoelastic measurement preferably is at least $1.0 \times 10^8$ Pa and more preferably is at least $8.0 \times 10^8$ Pa. E' is preferably not more than $5.0 \times 10^9$ Pa.

T2/T3 can be controlled by altering the conditions for producing the organosilicon polymer fine particles. E' can be controlled, e.g., by altering the molecular weight of the resin that constitutes the binder resin of the resin particle, by altering the glass transition temperature (Tg) of the binder resin, by introducing a crosslinking agent-derived structure into the binder resin, and by altering the conditions for producing the toner particle.

By having the structure occurrence ratio for the organosilicon polymer fine particles and the storage elastic modulus of the toner be in the indicated ranges, the development of deformation of the organosilicon polymer fine particles upon the input of external force is facilitated based on the ratio between the hardnesses of the toner particle and the organosilicon polymer fine particle. In addition, because the organosilicon polymer fine particle is provided with a structure having a high elastic recovery force, the ease of toner mobilization upon the input of external force is enhanced.

The organosilicon polymer fine particles are more preferably constituted of only units derived from trifunctional silane (X is 1.00), and $R^1$ in these units is more preferably an alkyl group having 1 to 6 (preferably 1 to 3, more preferably 1 or 2, and still more preferably 1) carbons. When an organosilicon polymer fine particle is constituted of only trifunctional units in which $R^1$ is an alkyl group having 1 to 6 carbons, such an organosilicon polymer fine particle is known as a polyalkylsilsesquioxane $[(R^1-SiO_{3/2})_n]$. When the organosilicon polymer fine particles are polyalkylsilsesquioxane fine particles, this facilitates achieving a uniform charge distribution and facilitates an excellent image density.

When the wettability of the organosilicon polymer fine particles with respect to a methanol/water mixed solvent is measured by the transmittance of light with a wavelength of 780 nm, the methanol concentration at a transmittance of 50% is preferably 50 volume % to 70 volume % and is more preferably 55 volume % to 60 volume %. By having the wettability be in the indicated range, the charging performance of the organosilicon polymer fine particles is raised and in combination with this the affinity with the toner particle is enhanced and reductions in the image density due to durability testing are readily restrained. This wettability can be controlled through surface treatment and surface modification of the organosilicon polymer fine particles.

The content of the organosilicon polymer fine particles in the toner is preferably 0.1 mass % to 5.0 mass % and more preferably 0.3 mass % to 3.0 mass %.

The binder resin that constitutes the toner particle is described in the following.

Vinyl resins and polyester resins are preferred examples of the binder resin. The following resins and polymers are examples of the vinyl resins and polyester resins as well as other binder resins:

homopolymers of styrene or a substituted form thereof, e.g., polystyrene and polyvinyltoluene; styrene copolymers such as styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, and styrene-maleate ester copolymer; as well as polymethyl methacrylate, polybutyl methacrylate, polyvinyl acetate, polyethylene, polypropylene, polyvinyl butyral, organosilicon polymer resins, polyamide resins, epoxy resins, polyacrylic resins, rosin, modified rosin, terpene resins, phenolic resins, aliphatic hydrocarbon resins, alicyclic hydrocarbon resins, and aromatic petroleum resins. A single one of these binder resins may be used by itself or a mixture of two or more may be used.

The toner particle preferably contains a colorant.

The following may be used as a black colorant: carbon black, magnetic bodies, and black colorants provided by color mixing using the yellow/magenta/cyan colorants given in the following to produce a black color.

Yellow colorants can be exemplified by compounds as represented by condensed azo compounds, isoindolinone compounds, anthraquinone compounds, azo-metal complexes, methine compounds, and allylamide compounds. The following are specific examples: C. I. Pigment Yellow 12, 13, 14, 15, 17, 62, 73, 74, 83, 93, 94, 95, 97, 109, 110, 111, 120, 128, 129, 138, 147, 150, 151, 154, 155, 168, 180, 185, and 214.

Magenta colorants can be exemplified by condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. The following are specific examples: C. I. Pigment Red 2, 3, 5, 6, 7, 23, 48:2, 48:3, 48:4, 57:1, 81:1, 122, 146, 166, 169, 177, 184, 185, 202, 206, 220, 221, 238, 254, and 269 and C. I. Pigment Violet 19.

Cyan colorants can be exemplified by copper phthalocyanine compounds and their derivatives, anthraquinone compounds, and basic dye lake compounds. Specific examples are C. I. Pigment Blue 1, 7, 15, 15:1, 15:2, 15:3, 15:4, 60, 62, and 66.

A single one of these colorants may be used or a mixture may be used, and these colorants may also be used in a solid solution state. The colorant is selected considering the hue angle, chroma, lightness, lightfastness, OHP transparency, and dispersibility in the toner. The amount of addition for the colorant is preferably 1 mass parts to 20 mass parts per 100 mass parts of the binder resin or polymerizable monomer that produces the binder resin.

The toner may also be made into a magnetic toner through the incorporation of a magnetic body as colorant.

The magnetic body can be exemplified by the following: iron oxides such as magnetite, hematite, and ferrite; metals such as iron, cobalt, and nickel; alloys of these metals with a metal such as aluminum, copper, magnesium, tin, zinc, beryllium, calcium, manganese, selenium, titanium, tungsten, and vanadium; and mixtures thereof.

The magnetic body is more preferably a surface-modified magnetic body. When the magnetic toner is prepared by a polymerization method, the magnetic body is preferably a magnetic body on which a hydrophobic treatment has been executed using a surface modifier that is a substance that does not inhibit polymerization. This surface modifier can be exemplified by silane coupling agents and titanium coupling agents.

The magnetic body has a number-average particle diameter preferably of not more than 2.0 μm and more preferably of 0.1 μm to 0.5 μm. The amount of incorporation in the toner particle, per 100 mass parts of the polymerizable monomer or binder resin, is preferably 20 mass parts to 200 mass parts and more preferably 40 mass parts to 150 mass parts.

The toner particle preferably contains a wax.

The wax component can be exemplified by the following: petroleum waxes, e.g., paraffin waxes, microcrystalline waxes, and petrolatum, and derivatives thereof; montan wax and derivatives thereof; hydrocarbon waxes provided by the Fischer-Tropsch method, and derivatives thereof; polyolefin waxes, e.g., polyethylene and polypropylene, and derivatives thereof; and natural waxes, e.g., carnauba wax and candelilla wax, and derivatives thereof. The derivatives encompass oxides and block copolymers and graft modifications with vinyl monomers. Additional examples are higher aliphatic alcohols, fatty acids such as stearic acid and palmitic acid and their compounds, acid amide waxes, and ester waxes.

The amount of addition for the wax is preferably 1 mass parts to 25 mass parts per 100 mass parts of the binder resin or polymerizable monomer that produces the binder resin.

The toner preferably has a toner particle that has a core portion and a shell portion. The assumption of a core/shell structure having a shell portion on the surface of a core portion can stop charging defects that are produced by exudation of the core portion to the toner particle surface.

The resin forming the shell portion of the toner particle is preferably a resin such as a polyester resin, styrene-acrylic copolymer, or styrene-methacrylic copolymer, with polyester resin being more preferred.

The resin forming the shell portion is used, per 100 mass parts of the binder resin or polymerizable monomer, preferably at 0.01 mass parts to 20.0 mass parts and more preferably at 0.5 mass parts to 10.0 mass parts.

The toner may also contain other external additives in order to enhance the properties of the toner.

The production method according to the present invention is described in the following.

In the present invention, organosilicon polymer fine particles are tightly attached to the toner particle surface without being embedded beyond a certain degree. When an external additive is attached to a toner particle, the attachment force here is determined by the attachment force per unit area, which is governed by the area of contact between the external additive and the toner particle and by the type of external additive and type of toner particle.

The organosilicon polymer has a low surface free energy and a high releasability and as a consequence the attachment force per unit area is low. Creating a large contact area is thus required in order to raise the attachment force; however, due to the elastic recovery force possessed by the organosilicon polymer fine particles, even with the application of impact, toner particle deformation does not develop and the contact area undergoes little increase.

The attachment force can be increased once the impact force is increased and impact is continuously applied, but the organosilicon polymer fine particles then end up being embedded. The attachment ratio is therefore preferably increased by the application of heat in order to bring about a strong attachment of the organosilicon polymer fine particles to the toner particle surface without embedding the organosilicon polymer fine particles beyond a certain degree. The application of heat causes the toner particle surface to undergo a slight deformation, and very small voids can then be filled with the organosilicon polymer fine particles, the contact area can be increased without causing burying in the toner particle surface, and the attachment force can be increased.

Moreover, more preferably the attachment ratio is increased by the application of heat after the organosilicon polymer fine particles have been hydrophilized by surface modification. This hydrophilization by surface modification refers to hydrophilization of the surface brought about by cleavage of chemical bonds at the surface to be modified and the bonding of hydroxyl groups originating with, e.g., atmospheric moisture.

Hydrophilization can, without altering the mechanical properties of the organosilicon polymer fine particles, bring about a transient increase in hydroxyl groups and carboxyl groups, which are highly reactive with the surface of the fine particles A, and can raise the attachment force per unit area between the toner particle and the organosilicon polymer fine particle. Through the application of heat after surface modification, very small voids in the toner particle are filled with organosilicon polymer fine particles in a state in which the attachment force per unit area is high and the contact area can be increased without embedding the organosilicon polymer fine particles beyond a certain degree. As a consequence, the attachment ratio can be raised still further without embedding the organosilicon polymer fine particles in the toner particle surface beyond a certain degree. By applying both an impact force and heat at the same time, the embedding depth of the organosilicon polymer fine particles can also be controlled in accordance with the particle diameter of the organosilicon polymer fine particles.

In order to achieve the embedding depth and attachability for the organosilicon polymer fine particles according to the present invention, the temperature $T_R$ of the heating step is set to around the glass transition temperature Tg of the toner particle.

Specifically, the toner production method of the present invention is a method for producing a toner, having a step of treating a mixture that contains a binder resin-containing toner particle and fine particles A, wherein:

the fine particles A are organosilicon polymer fine particles and the organosilicon polymer fine particles have a number-average primary particle diameter of 30 nm to 500 nm;

the aforementioned step comprises a heating step of subjecting the mixture to a heated mixing treatment;

the following formula (III) is satisfied where $T_R$ (° C.) is the temperature in the heating step and Tg (° C.) is the glass transition temperature of the toner particle; and the following formula (IV) is satisfied where E (W·h/g) is the mixing treatment energy in the heating step.

$$Tg-10(° C.) \leq T_R \leq Tg+10(° C.) \tag{III}$$

$$1.0 \times 10^{-4}(W \cdot h/g) \leq E \leq 1.0 \times 10^{-1}(W \cdot h/g) \tag{IV}$$

The temperature $T_R$ in the heating step preferably satisfies Tg−10 (° C.)≤$T_R$≤Tg+5 (° C.) and more preferably satisfies Tg−5 (° C.)≤$T_R$≤Tg+5 (° C.).

The mixing treatment energy E in the heating step is preferably $1.0 \times 10^{-3}$ W·h/g to $1.0 \times 10^{-1}$ W·h/g and is more preferably $5.0 \times 10^{-3}$ W·h/g to $5.0 \times 10^{-2}$ W·h/g.

The heating time is not particularly limited, but is preferably 3 minutes to 30 minutes and more preferably 3 minutes to 10 minutes. From the standpoint of the storability, the glass transition temperature Tg of the toner particle is preferably 40° C. to 70° C. and is more preferably 50° C. to 65° C.

Figure 2:
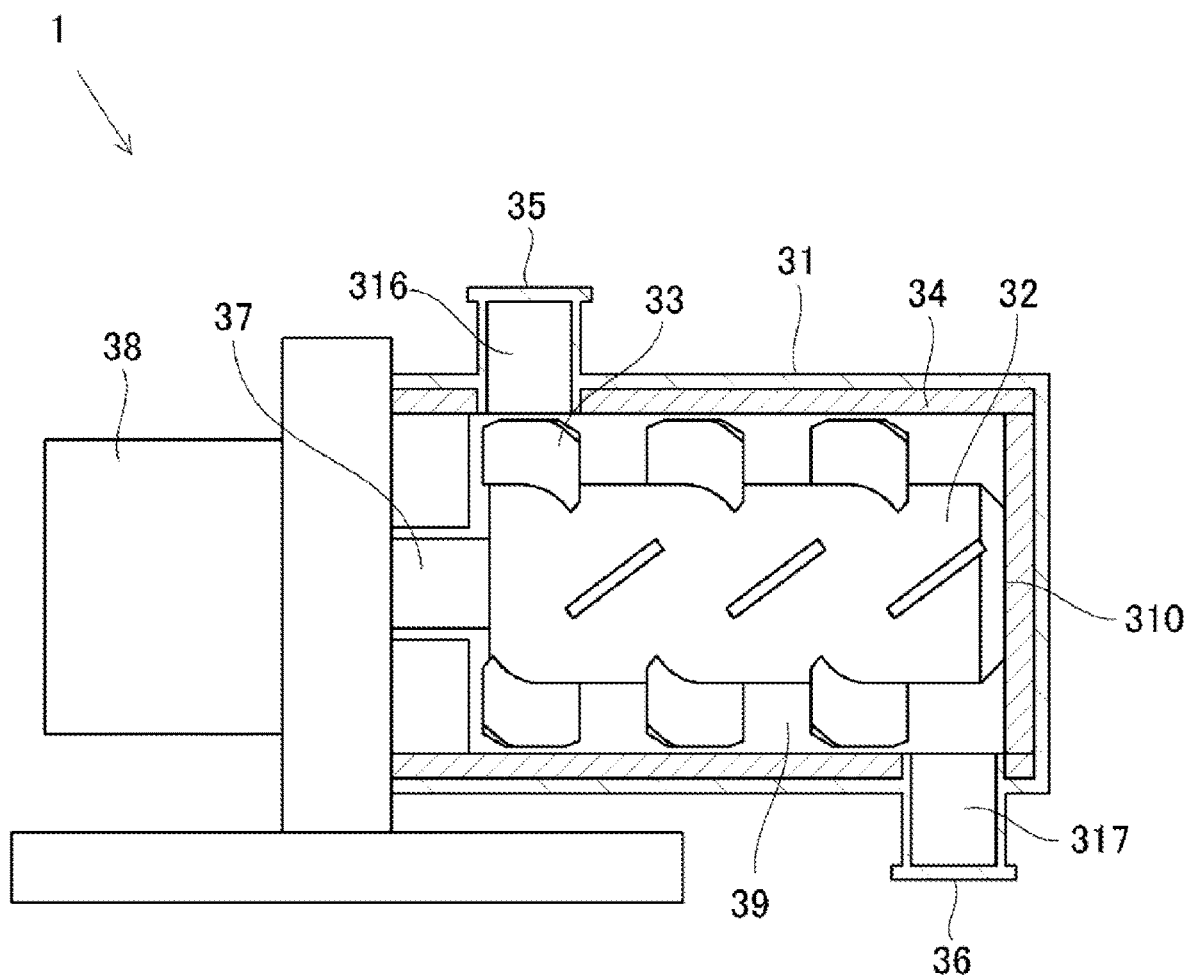
FIG. 2 is a schematic diagram that shows an example of a mixing treatment apparatus.

An apparatus having a mixing capability is preferred for the apparatus used in the heating step, and, while a known mixing treatment apparatus can be used, a mixing treatment apparatus 1 as shown in FIG. 2 is particularly preferred.

FIG. 2 is a schematic diagram that shows an example of a mixing treatment apparatus 1 that can be used in the heating step.

Figure 3:
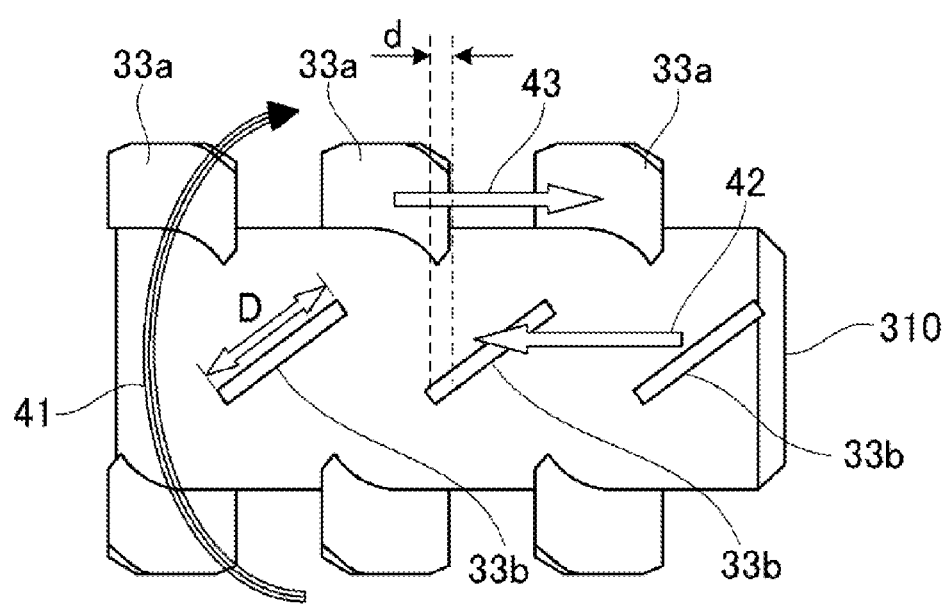
FIG. 3 is a schematic diagram that shows an example of a mixing member used in a mixing treatment apparatus.

FIG. 3, on the other hand, is a schematic diagram that shows an example of the structure of a stirring member used in the mixing treatment apparatus 1. The mixing treatment apparatus 1 has a rotating member 32, on the surface of which at least a plurality of stirring members 33 are disposed; a drive member 38, which drives the rotation of the rotating member; and a main casing 31, which is disposed to have a gap with the stirring members 33.

The organosilicon polymer fine particles can be attached to the toner particle surface, while the organosilicon polymer fine particles are being broken up from secondary particles into primary particles, by the efficient application of heat to the toner particle and the uniform application of shear to the toner particle at the gap (clearance) between the inner circumference of the main casing 31 and the stirring member 33.

The diameter of the inner circumference of the main casing 31 in this apparatus is not more than twice the diameter of the outer circumference of the rotating member 32. In the example shown in FIG. 2, the diameter of the inner circumference of the main casing 31 is 1.7-times the diameter of the outer circumference of the rotating member 32 (the trunk diameter provided by subtracting the stirring member 33 from the rotating member 32). When the diameter of the inner circumference of the main casing 31 is not more than twice the diameter of the outer circumference of the rotating member 32, the organosilicon polymer fine particles in the form of secondary particles can be satisfactorily dispersed because the treatment space in which forces act on the toner particle is suitably limited.

In addition, it is important that the aforementioned clearance be adjusted in conformity to the size of the main casing. It is important, from the standpoint of the efficient application of heat to the toner particle, that the clearance be made about 1% to 5% of the diameter of the inner circumference of the main casing 31. Specifically, when the diameter of the inner circumference of the main casing 31 is approximately 130 mm, the clearance is preferably made approximately 2 mm to 5 mm; when the diameter of the inner circumference of the main casing 31 is approximately 800 mm, the clearance is preferably made approximately 10 mm to 30 mm.

As shown in FIG. 3, at least a portion of the plurality of stirring members 33 is formed as a forward transport stirring member 33a that, accompanying the rotation of the rotating member 32, transports the toner particle in one direction along the axial direction of the rotating member. In addition, at least a portion of the plurality of stirring members 33 is formed as a back transport stirring member 33b that, accompanying the rotation of the rotating member 32, returns the toner particle in the other direction along the axial direction of the rotating member. Here, when the starting material inlet port 35 and the product discharge port 36 are disposed at the two ends of the main casing 31, as in FIG. 2, the direction toward the product discharge port 36 from the starting material inlet port 35 (the direction to the right in FIG. 2) is the "forward direction".

That is, as shown in FIG. 3, the face of the forward transport stirring member 33a is tilted so as to transport the toner particle in the forward direction 43. On the other hand, the face of the stirring member 33b is tilted so as to transport the toner particle in the back direction 42.

By doing this, the heat treatment is carried out while repeatedly performing transport in the "forward direction" 43 and transport in the "back direction" 42. In addition, with regard to the stirring members 33a and 33b, a plurality of members disposed at intervals in the circumferential direction of the rotating member 32 form a set. In the example shown in FIG. 3, two members at an interval of 180° with each other form a set of the stirring members 33a, 33b on the rotating member 32, but a larger number of members may form a set, such as three at an interval of 120° or four at an interval of 90°.

In the example shown in FIG. 3, a total of twelve stirring members 33a, 33b are formed at an equal interval.

Furthermore, D in FIG. 3 indicates the width of a stirring member and d indicates the distance that represents the overlapping portion of a stirring member. From the standpoint of bringing about an efficient transport of the toner in the forward direction and back direction, D in FIG. 3 is preferably a width that is approximately 20% to 30% of the length of the rotating member 32. FIG. 3 shows an example in which D is 23%. Furthermore, when, for stirring members 33a, 33b, an extension line is drawn in the perpendicular direction from the location of the end of the stirring member 33a, a certain overlapping portion d of the stirring member 33a with the stirring member 33b is preferably present.

This enables and supports the efficient dispersion of the organosilicon polymer fine particles at the toner particle surface. This d is preferably 10% to 30% of D from the standpoint of the application of shear.

In addition to the shape shown in FIG. 3, the blade shape may be a shape having a curved surface or a paddle structure in which a distal blade element is connected to the rotating member 32 by a rod-shaped arm insofar as the toner particle can be transported in the forward direction and back direction and the clearance can be maintained.

A more detailed description is provided in the following with reference to the schematic diagrams of the apparatus shown in FIG. 2 and FIG. 3.

The apparatus shown in FIG. 2 has a rotating member 32, which has at least a plurality of stirring members 33 disposed on its surface; a drive member 38 that drives the rotation of the rotating member 32; and a main casing 31, which is disposed forming a gap with the stirring members 33. Also present is a jacket 34, in which a heat transfer medium can flow and which resides on the inside of the main casing 31 and adjacent to the end surface 310 of the rotating member.

The apparatus shown in FIG. 2 also has a starting material inlet port 35, which is formed in the upper part of the main casing 31, and a product discharge port 36, which is formed in the lower part of the main casing 31. The starting material inlet port 35 is used to introduce the toner particle, and the product discharge port 36 is used to discharge the toner, which has been subjected to an external addition and mixing treatment, from the main casing 31 to the outside.

In addition, the apparatus shown in FIG. 2 has a starting material inlet port inner piece 316 inserted in the starting material inlet port 35 and a product discharge port inner piece 317 inserted in the product discharge port 36.

The starting material inlet port inner piece 316 is first removed from the starting material inlet port 35; the toner particles are introduced into the treatment space 39 from the starting material inlet port 35; and the starting material inlet port inner piece 316 is inserted. The rotating member 32 is then rotated by the drive member 38 (41 represents the direction of rotation), and the material to be treated, which has been introduced as described above, is subjected to a heated mixing treatment while being stirred and mixed by the plurality of stirring members 33 disposed on the surface of the rotating member 32.

Heating can be carried out by running hot water at a desired temperature through the jacket 34. The temperature is monitored using a thermocouple disposed inside the starting material inlet port inner piece 316. In order to stably obtain the toner according to the present invention, the temperature $T_R$ (thermocouple temperature, ° C.) within the starting material inlet port inner piece 316 preferably satisfies Tg−10 (° C.)≤$T_R$≤Tg+5 (° C.) and more preferably satisfies Tg−5 (° C.)≤$T_R$≤Tg+5 (° C.) where Tg (° C.) is the glass transition temperature of the toner particle.

Considering the conditions in the heated mixing treatment, the power (W/g) from the drive member 38 should be controlled so the mixing treatment energy E (W·h/g) is in the range from $1.0 \times 10^{-4}$ W·h/g to $1.0 \times 10^{-4}$ W·h/g, but is not otherwise particularly limited.

Based on the embedding state of the organosilicon polymer fine particles achieved by the heating step, in the present invention preferably a slight melting of the surface is promoted by heating without further embedding. A mechanical impact force is therefore preferably not applied to the toner. On the other hand, a minimal power is required in order to provide a uniform state of coverage by the organosilicon polymer fine particles, and the power is preferably controlled so as to bring the mixing treatment energy E (W·h/g) into the range indicated above.

The power from the drive member 38 represents the value obtained by subtracting the empty power (W) during operation when toner has not been introduced, from the power (W) when toner has been introduced, and dividing by the amount of toner introduction (g).

The treatment time is not particularly limited because it also depends on the heating temperature, but is preferably 3 minutes to 30 minutes and is more preferably 3 minutes to 10 minutes. Coexistence between attachment and toner strength is facilitated by controlling into the indicated range.

The stirring member rotation rate is not particularly limited as long as, in order to operate at the aforementioned power and mixing treatment energy E, E (W·h/g) is in the range from $1.0 \times 10^{-4}$ W·h/g to $1.0 \times 10^{-4}$ W·h/g. In an apparatus in which the volume of the treatment space 39 in the apparatus shown in FIG. 2 is $2.0 \times 10^{-3}$ m$^3$, the stirring member rotation rate, for the stirring member 33 shape shown in FIG. 3, is preferably 50 rpm to 500 rpm. 100 rpm to 300 rpm is more preferred.

After completion of the mixing treatment, the product discharge port inner piece 317 in the product discharge port 36 is removed and the rotating member 32 is rotated by the drive member 38 to discharge the toner from the product discharge port 36. As necessary, coarse particles and so forth in the toner may be separated using a screen or sieve, for example, a circular vibrating screen.

When the organosilicon polymer fine particles are attached using a heating step using the mixing treatment apparatus 1, the organosilicon polymer fine particles are preferably externally added in a preliminary external addition step.

A toner to which the organosilicon polymer fine particles have been externally added to the toner particle can be obtained in the external addition step using a known mixer, e.g., an FM mixer (Nippon Coke & Engineering Co., Ltd.), Supermixer (Kawata Mfg. Co., Ltd.), Nobilta (Hosokawa Micron Corporation), or Hybridizer (Nara Machinery Co., Ltd.).

External addition and attachment may also be carried out on the toner in one step by heating in the external addition step, and a known mixing treatment apparatus can be used when attachment and external addition are carried out in a single step in an external addition step.

When attachment and external addition are carried out in a single step in an external addition step, this step can be realized by carrying out operation while heating by flowing hot water at a desired temperature through a jacket in a known mixer, e.g., an FM mixer (Nippon Coke & Engineering Co., Ltd.), Supermixer (Kawata Mfg. Co., Ltd.), Nobilta (Hosokawa Micron Corporation), or Hybridizer (Nara Machinery Co., Ltd.).

The production method for obtaining the toner preferably further comprises a surface modification step of modifying the surface of the organosilicon polymer fine particle to hydrophilicity. Here, in measurement of the wettability versus a methanol/water mixed solvent using the transmittance of light at a wavelength of 780 nm, hydrophilicity refers to 50 volume % to 70 volume % for the methanol concentration when the transmittance is 50%.

For example, an ultraviolet treatment, plasma treatment, and so forth can be used as the method for modifying the surface of the organosilicon polymer fine particle to hydrophilicity.

For example, a low-pressure mercury lamp or excimer lamp discharging at a peak wavelength of 185 nm or 254 nm can be used for the ultraviolet treatment. For example, an excimer irradiation unit (Ushio Inc.) can be used for the excimer lamp, and an EUV-200 (Sen Lights Corporation) can be used for the low-pressure mercury lamp. In order to perform a uniform surface modification of the organosilicon polymer fine particles, the irradiation with ultraviolet light is desirably carried out while uniformly spreading the organosilicon polymer fine particles out into a thin layer or while stirring the organosilicon polymer fine particles.

In the case of a plasma treatment, for example, a PPU-800 (Sakigake Semiconductor Co., Ltd.) or a Plamino powder atmospheric pressure plasma treatment device (Kyushu Keisokki Co., Ltd.) can be used.

The aforementioned heating step is preferably carried out after the surface modification step. The effects due to surface modification generally decay with time, and the heating step is therefore preferably disposed after the surface modification step without the elapse of time. When the surface modification step is an ultraviolet treatment, substitution of the atmosphere with nitrogen during treatment is unnecessary and there is also great freedom with regard to the disposition of the light source, and due to this a simultaneous combination with the heating step is also possible.

The method for producing the toner particle is described in the following.

There are no particular limitations on the method for producing the toner particle. Methods that directly produce the toner particle in a hydrophilic medium (also referred to hereafter as polymerization methods), e.g., suspension polymerization methods, interfacial polymerization methods, dispersion polymerization methods, and so forth, are examples. In addition, a pulverization method may be used and the toner particle yielded by the pulverization method may be subjected to a thermal spheronizing.

Among the preceding, a toner particle produced by a suspension polymerization method, which has a high transferability because the individual particles are uniformly approximately spherical and the charge quantity distribution is also relatively uniform, is preferred.

Suspension polymerization methods are methods in which the toner particle is produced by proceeding through a granulation step and a polymerization step. In the granulation step, a polymerizable monomer composition, which has polymerizable monomer that produces the binder resin, colorant, and optionally additives such as wax and so forth, is dispersed in an aqueous medium to produce droplets of the polymerizable monomer composition. The polymerizable monomer in the droplets is polymerized in the polymerization step.

Vinyl polymerizable monomers are favorable examples of the polymerizable monomer that can be used to produce the binder resin.

Specific examples are as follows: styrene; styrene derivatives such as α-methylstyrene, β-methyl styrene, o-methyl styrene, m-methyl styrene, p-methylstyrene, and 2,4-dimethylstyrene; acrylic polymerizable monomers such as methyl acrylate, ethyl acrylate, n-propyl acrylate, isopropyl acrylate, n-butyl acrylate, isobutyl acrylate, tert-butyl acrylate, and 2-ethylhexyl acrylate; methacrylic polymerizable monomers such as methyl methacrylate, ethyl methacrylate, n-propyl methacrylate, isopropyl methacrylate, n-butyl methacrylate, isobutyl methacrylate, and tert-butyl methacrylate; esters of methylene aliphatic monocarboxylic acids; and vinyl esters such as vinyl acetate, vinyl propionate, vinyl butyrate, vinyl benzoate, and vinyl formate.

The following is an example of a production method for producing the toner particle by a pulverization method.

In a starting material mixing step, the materials constituting the toner particle, e.g., binder resin, colorant, and other optional additives, are metered out in prescribed amounts and are blended and mixed. The mixing apparatus can be exemplified by the double cone mixer, V-mixer, drum mixer, Super mixer, FM mixer, Nauta mixer, and Mechano Hybrid (Nippon Coke & Engineering Co., Ltd.).

The mixed material is then melt-kneaded to disperse the colorant and so forth in the binder resin. A batch kneader, e.g., a pressure kneader, Banbury mixer, and so forth, or a continuous kneader can be used in the melt-kneading step. Single-screw extruders and twin-screw extruders are preferred because they support continuous production. Examples here are the KTK twin-screw extruder (Kobe Steel, Ltd.), TEM twin-screw extruder (Toshiba Machine Co., Ltd.), PCM kneader (Ikegai Corp.), Twin Screw Extruder (KCK), Co-Kneader (Buss), and Kneadex (Nippon Coke & Engineering Co., Ltd.). The resin composition yielded by melt-kneading may be rolled out with, e.g., a two-roll mill, and may be cooled with, e.g., water, in a cooling step.

The cooled resin composition may then be pulverized to the desired particle diameter in a pulverization step. In the pulverization step, a coarse pulverization is performed using a coarse pulverizer followed by a fine pulverization using a fine pulverizer. The coarse pulverizer can be exemplified by a crusher, hammer mill, and feather mill. The fine pulverizer can be exemplified by the Kryptron System (Kawasaki Heavy Industries, Ltd.), Super Rotor (Nisshin Engineering Inc.), and Turbo Mill (Freund-Turbo Corporation) and by air jet systems.

The toner particle can then be obtained as necessary by carrying out classification using a sieving apparatus or a classifier such as the following. For example, an internal classification system such as the Elbow Jet (Nittetsu Mining Co., Ltd.) or a centrifugal classification system such as the Turboplex (Hosokawa Micron Corporation), TSP Separator (Hosokawa Micron Corporation), or Faculty (Hosokawa Micron Corporation) can be used for classification.

The toner particle may also be subjected to spheronizing. The following are examples of systems that can be used for a post-pulverization spheronizing treatment: the Hybridization System (Nara Machinery Co., Ltd.), Mechanofusion System (Hosokawa Micron Corporation), Faculty (Hosokawa Micron Corporation), and Meteo Rainbow MR Type (Nippon Pneumatic Mfg. Co., Ltd.).

The methods used to measure the various properties of the toner are described in the following.

Identification of Organosilicon Polymer Fine Particles

The composition and ratios for the constituent compounds of the organosilicon polymer fine particles contained in the toner are identified using pyrolysis gas chromatography-mass analysis (also abbreviated in the following as "pyrolysis GC/MS") and NMR. When the organosilicon polymer fine particles can be independently acquired as such, measurement can also be carried out on these organosilicon polymer fine particles as such.

Pyrolysis GC/MS is used for analysis of the species of constituent compounds of the organosilicon polymer fine particles.

The species of constituent compounds of the organosilicon polymer fine particles are identified by analysis of the mass spectrum of the pyrolyzate components derived from the organosilicon polymer fine particles and produced by pyrolysis of the toner at about 550° C. to 700° C. The specific measurement conditions are as follows.

Measurement Conditions for Pyrolysis GC/MS pyrolysis instrument: JPS-700 (Japan Analytical Industry Co., Ltd.)

pyrolysis temperature: 590° C.

GC/MS instrument: Focus GC/ISQ (Thermo Fisher)

column: HP-5MS, 60 m length, 0.25 mm inner diameter, 0.25 μm film thickness injection port temperature: 200° C.

flow pressure: 100 kPa split: 50 mL/min

MS ionization: EI ion source temperature: 200° C., 45 to 650 mass range

The abundance of the identified constituent compounds of the organosilicon polymer fine particles is then measured and calculated using solid-state $^{29}$Si-NMR.

In solid-state $^{29}$Si-NMR, peaks are detected in different shift regions depending on the structure of the functional groups bonded to the Si in the constituent compounds of the organosilicon polymer fine particles.

Each peak position identifies a structure bonded to Si through identification using a reference sample. The abundance of each constituent compound is calculated from the obtained peak areas. The determination is carried out by calculating the proportion for the peak area for the T3 unit structure.

The measurement conditions for the solid-state $^{29}$Si-NMR are as follows.

instrument: JNM-ECX5002 (JEOL RESONANCE)

temperature: room temperature measurement method: DDMAS method, 29Si, 45° sample tube: zirconia 3.2 mmφ sample: powder filled into test tube sample rotation rate: 10 kHz relaxation delay: 180 s scans: 2,000

When the toner contains silicon-containing material other than the organosilicon polymer fine particles, the toner is dispersed in a solvent such as chloroform and the silicon-containing material other than the organosilicon polymer fine particles is then removed, for example, by centrifugal separation, based on the difference in specific gravity. This method is as follows.

1 g of the toner is first added to and dispersed in 31 g of chloroform in a vial and the silicon-containing material other than the organosilicon polymer fine particles is separated from the toner. To effect dispersion, a dispersion is prepared by treatment for 30 minutes using an ultrasound homogenizer. The treatment conditions are as follows.
ultrasound treatment instrument: VP-050 ultrasound homogenizer (TIETECH Co., Ltd.)
microtip: stepped microtip, 2 mmφ end diameter
position of microtip end: center of glass vial, 5 mm height from bottom of vial
ultrasound conditions: 30% intensity, 30 minutes; during this treatment, the ultrasound is applied while cooling the vial with ice water to prevent the temperature of the dispersion from rising The dispersion is transferred to a glass tube (50 mL) for swing rotor service, and centrifugal separation is carried out using a centrifugal separator (H-9R, Kokusan Co., Ltd.) and conditions of 3,500 rpm for 30 minutes. The following are separated in the glass tube after centrifugal separation: the silicon-containing material other than the organosilicon polymer fine particles, and a sediment provided by the removal from the toner of the silicon-containing material other than the organosilicon polymer fine particles. The sediment provided by the removal from the toner of the silicon-containing material other than the organosilicon polymer fine particles is withdrawn and is dried under vacuum conditions (40° C./24 hours) to obtain a sample provided by the removal from the toner of the silicon-containing material other than the organosilicon polymer fine particles. The composition and ratios for the constituent compounds of the organosilicon polymer fine particles contained in the toner can then be determined using the same procedure as described above.

Method for Quantitating Organosilicon Polymer Fine Particles Contained in Toner

The content of the organosilicon polymer fine particles contained in the toner is measured using x-ray fluorescence.

The x-ray fluorescence measurement is based on JIS K 0119-1969, and specifically is carried out as follows. An "Axios" wavelength-dispersive x-ray fluorescence analyzer (PANalytical B.V.) is used as the measurement instrument, and the "SuperQ ver. 5.0 L" (PANalytical B.V.) software provided with the instrument is used in order to set the measurement conditions and analyze the measurement data. Rh is used for the x-ray tube anode; a vacuum is used for the measurement atmosphere; and the measurement diameter (collimator mask diameter) is 27 mm. With regard to the measurement, measurement is carried out using the Omnian method in the element range from F to U, and detection is carried out with a proportional counter (PC) in the case of measurement of the light elements and with a scintillation counter (SC) in the case of measurement of the heavy elements. The acceleration voltage and current value for the x-ray generator are established so as to provide an output of 2.4 kW. For the measurement sample, 4 g of the toner is introduced into a specialized aluminum compaction ring and is smoothed over, and, using a "BRE-32" tablet compression molder (Maekawa Testing Machine Mfg. Co., Ltd.), a pellet is produced by molding to a thickness of 2 mm and a diameter of 39 mm by compression for 60 seconds at 20 MPa, and this pellet is used as the measurement sample.

X-ray exposure is carried out on the pellet molded under the aforementioned conditions, and the resulting characteristic x-rays (fluorescent x-rays) are dispersed with a dispersion element. The intensity of the fluorescent x-rays dispersed at the angle corresponding to the wavelength specific to each element contained in the sample is analyzed by the fundamental parameter method (FP method), the content ratio for each element contained in the toner is obtained as a result of the analysis, and the silicon atom content in the toner is determined.

The content of the organosilicon polymer fine particles in the toner can be obtained by calculation from the relationship between the silicon content in the toner that is determined by x-ray fluorescence and the content ratio for the silicon in the constituent compounds of the organosilicon polymer fine particles for which the structure has been established using, e.g., solid-state $^{29}$Si-NMR and pyrolysis GC/MS.

When a silicon-containing material other than the organosilicon polymer fine particles is contained in the toner, using the same methods as described above, a sample provided by the removal from the toner of the silicon-containing material other than the organosilicon polymer fine particles, can be obtained and the organosilicon polymer fine particles contained in the toner can be quantitated.

Method for Measuring Presence/Absence of T Unit Structure in Organosilicon Polymer Particles and Proportion for Peak Area Originating with Silicon Having T Unit Structure The results for the solid-state $^{29}$Si-NMR measured in "Identification of Organosilicon Polymer Fine Particles" are used for the presence/absence of the T unit structure in the organosilicon polymer fine particles and the proportion for the peak area originating with silicon having the T unit structure.

In solid-state $^{29}$Si-NMR, peaks are detected in different shift regions depending on the type and number of functional groups (monofunctional to tetrafunctional) bonded to Si in the constituent compounds of the organosilicon polymer fine particles. The proportion for the T unit structure is taken to be the proportion for the trifunctional peak area with reference to the total area for all peaks from monofunctional to tetrafunctional. In addition, the proportions for T2 and T3 are determined from the fine positions of these peaks and from the total peak area for the T unit structure.

Method for Measuring Number-Average Primary Particle Diameter of Organosilicon Polymer Fine Particles Measurement of the number-average primary particle diameter of the organosilicon polymer fine particles is performed using an "S-4800" scanning electron microscope (product name, Hitachi, Ltd.). Observation is carried out on the toner to which organosilicon polymer fine particles have been added; in a visual field enlarged by a maximum of 50,000×, the long diameter of the primary particles of 100 randomly selected organosilicon polymer fine particles is measured; and the number-average particle diameter is determined. The enlargement factor in the observation is adjusted as appropriate depending on the size of the organosilicon polymer fine particles.

When the organosilicon polymer fine particles can be independently acquired as such, measurement can also be performed on these organosilicon polymer fine particles as such.

When the toner contains fine particles other than the organosilicon polymer fine particles, EDS analysis is carried out on the individual particles of the external additive during observation of the toner and the determination is made, based on the presence/absence of a peak for the element Si, as to whether the analyzed particles are organosilicon polymer fine particles.

When the toner contains both organosilicon polymer fine particles and silica fine particles, the organosilicon polymer fine particles are identified by comparing the ratio (Si/O ratio) for the Si and O element contents (atomic %) with a standard. EDS analysis is carried out under the same conditions on standards for both the organosilicon polymer fine particles and silica fine particles to obtain the element content (atomic %) for both the Si and O. Using A for the Si/O ratio for the organosilicon polymer fine particles and B for the Si/O ratio for the silica fine particles, measurement conditions are selected whereby A is significantly larger than B. Specifically, the measurement is run ten times under the same conditions on the standards and the arithmetic mean value is obtained for both A and B. Measurement conditions are selected whereby the obtained average values satisfy A/B>1.1.

When the Si/O ratio for a fine particle to be classified is on the A side from [(A+B)/2], the fine particle is then scored as an organosilicon polymer fine particle.

Tospearl 120A (Momentive Performance Materials Japan LLC) is used as the standard for the organosilicon polymer fine particles, and HDK V15 (Asahi Kasei Corporation) is used as the standard for the silica fine particles.

Method for Measuring Penetration Depth (b), Protrusion Height (c), and Penetration Index (b/(b+c)) of Organosilicon Polymer Fine Particles (1) Observation of Toner Cross Section by TEM The toner is dispersed in a visible light-curable resin (product name: Aronix LCR Series D-800, Toagosei Co., Ltd.) and curing is then carried out by exposure to short-wavelength light. The resulting cured material is sectioned using an ultramicrotome equipped with a diamond knife to prepare 250-nm thin-section samples. Images of the toner particle cross section are then obtained using the sectioned samples and a transmission electron microscope (product name: JEM-2800 Electron Microscope, JEOL Ltd.) (TEM-EDX) at a magnification of 40,000× to 50,000×.

The toner for observation is selected as follows.

First, the toner particle cross-sectional area is determined from the toner particle cross-sectional image, and the diameter (circle-equivalent diameter) of the circle having the same area as the cross-sectional area is determined. Observation is performed only on toner particle cross-sectional images for which the absolute value of the difference between this circle-equivalent diameter and the weight-average particle diameter (D4) of the toner is within 1.0 μm.

(2) Method for Calculating Penetration Depth (b) of Organosilicon Polymer Fine Particles, Protrusion Height (c) of Organosilicon Polymer Fine Particles, and Penetration Index (b/(b+c))

An expansion image of the toner is obtained by the following step (i) to (iii):
(i) obtaining a cross sectional image of the toner with a transmission electron microscope;
(ii) in the cross sectional image, determining a line along a perimeter of the surface of the toner particle; and
(iii) obtaining an expansion image of the cross sectional image by expanding the line determined in the step (ii) into a straight line.

Then, by using the obtained expansion image, subjecting a following analysis as to the respective organosilicon polymer particles on the surface of the toner particle.

Determining a contour line segment of the organosilicon polymer fine particle constituting an interface of the organosilicon polymer fine particle and the toner particle, and defining the contour line segment as a contour line segment X.

Connecting both ends of the contour line segment X with a straight line segment Z.

Drawing perpendicular line segments with respect to the straight line segment Z towards the contour line segment X.

Determining, among perpendicular line segments, a perpendicular line segment having a maximum length, and an average value of the maximum length of each of the organosilicon polymer particles is defined as the penetration depth b.

Determining a contour line segment of the organosilicon polymer fine particle that excludes the contour line segment X, and defining the contour line segment as a contour line segment Y.

Drawing perpendicular line segments with respect to the straight line segment Z towards the line segment Y.

Determining, among perpendicular line segments, a perpendicular line segment having a maximum length, and average value of the maximum length of each of the organosilicon polymer particles is defined as the protrusion height c.

More specifically, Using the TEM image in which a 400 nm region has been sectioned from the surface of the organosilicon polymer fine particle toward the interior of the toner particle, a line is drawn along the perimeter of the toner particle using the line drawing tool (select Segmented line on the Straight tab) of Image J image processing software (can be obtained from https://imagej.nih.gov/ij/). In regions where the protrusion of an organosilicon polymer fine particle is embedded in the toner particle, the line is drawn so as to maintain the curvature of the contour line of the toner particle as if the embedding were absent.

Expansion to an expansion image is performed based on this line (select Selection on the Edit tab; change the line width to 500 pixels at properties; then select Selection on the Edit tab and perform Straightener) (refer to FIG. 1). The penetration depth b (nm) of the organosilicon polymer fine particles and the protrusion height c (nm) of the fine particles A are determined using this expansion image.

b/(b+c), which is an index for the penetration of the organosilicon polymer fine particles, is determined from the values of the penetration depth b and the protrusion height c. With regard to the number of particles analyzed, 100 of the organosilicon polymer fine particles are analyzed and the average value thereof is used as the b and c of the sample.

Method for Measuring Attachment Index of Organosilicon Polymer Fine Particles

An evaluation of the amount of transfer of the organosilicon polymer fine particles when the toner is brought into contact with a substrate is used as the procedure for expressing the state of attachment of the organosilicon polymer fine particles as an index. With regard to the material of the surface layer of the substrate, a substrate that uses a polycarbonate resin for the surface layer material is used in the present invention as a substrate that simulates the surface layer of the photosensitive member. Specifically, a coating solution is first prepared by dissolving a bisphenol Z-type polycarbonate resin (product name: Iupilon Z-400, Mitsubishi Engineering-Plastics Corporation, viscosity-average molecular weight (Mv)=40,000) in toluene to a concentration of 10 mass %.

Using a #50 Mayer bar, this coating solution is coated on a 50 μm-thick aluminum sheet to form a coating film. This coating film is dried for 10 minutes at 100° C. to produce a sheet having a polycarbonate resin layer (film thickness=10

µm) on the aforementioned aluminum sheet. This sheet is supported with a substrate holder. The substrate is a square with approximately 3 mm edges.

The measurement step is subdivided into a step of placing the toner on the substrate, a step of removing the toner from the substrate, and a step of quantitating the amount of attachment of the organosilicon polymer fine particles that have been supplied to the substrate, and these are described in the following in order to describe the measurement step.

Step of Placing Toner on Substrate

The toner is placed in a soft porous material (denoted below as the "toner carrier"), and this toner carrier is brought into contact with the substrate. A sponge (product name: White Wiper, Marusan Industry Co., Ltd.) is used for the toner carrier. The toner carrier is fixed to the end of a load cell that itself is fixed to a stage that moves in the perpendicular direction with respect to the contact surface of the substrate, whereby the toner carrier and substrate can be brought into contact while measuring the load. With regard to contact between the toner carrier and substrate, and designating one step as moving the stage to press the toner carrier against the substrate until the load cell displays 10 N and then separating, this step is carried out 5 times.

Step of Removing Toner from Substrate

After contact with the toner carrier, an elastomeric suction opening with an inner diameter of approximately 5 mm, which is connected to the nozzle end of a vacuum cleaner, is brought into proximity to the substrate so as to be perpendicular to the toner placement side and the toner adhered on the substrate is removed. This removal is carried out while visually ascertaining the degree to which the toner remains. The distance between the substrate and the end of the suction opening is 1 mm, and the duration of suction is 3 seconds and the suction pressure is 6 kPa.

Step of Quantitating Amount of Attachment of Organosilicon Polymer Fine Particles that have been Supplied to Substrate Image measurement during observation with a scanning electron microscope is used to quantitate the amount and shape of the organosilicon polymer fine particles that remain on the substrate after removal of the toner. First, after removal of the toner, platinum is sputtered on the substrate using conditions of a current of 20 mA and 60 seconds to prepare a specimen for observation. An observation magnification that enabled observation of the organosilicon polymer fine particles was selected for observation with the scanning electron microscope. A Hitachi Ultrahigh Resolution Field Emission Scanning Electron Microscope (product name: S-4800, Hitachi High-Technologies Corporation) is used for the scanning electron microscope, and observation with the S-4800 (product name) is carried out using the backscattered electron image. 50,000× is used for the observation magnification, 10 kV is used for the acceleration voltage, and 3 mm is used for the working distance. In the image yielded by the observation, the organosilicon polymer fine particles are displayed at high brightness and the substrate is displayed at low brightness, and because of this the amount of the organosilicon polymer fine particles in a visual field can be quantitated by binarization. The binarization conditions are selected as appropriate in accordance with the observation instrument and the sputtering conditions. ImageJ image analysis software (can be obtained from https://imagej.nih.gov/ij/) is used for binarization in the present invention. Only the area of the organosilicon polymer fine particles is summed by the ImageJ, and the area ratio for the organosilicon polymer fine particles in the observed visual field is determined by dividing by the area of the overall observed visual field. This measurement is carried out on 100 binarized images, and the average value thereof is used as the area ratio [A] (unit: area %) for the organosilicon polymer fine particles on the substrate.

The coverage ratio [B] (unit: area %) by the organosilicon polymer fine particles on the toner particle is then calculated. The coverage ratio by the organosilicon polymer fine particles is measured using image measurement in observation with a scanning electron microscope. The same magnification as in the observation of the organosilicon polymer fine particles on the substrate is adopted for the observation magnification used to observe the organosilicon polymer fine particles in the observation with the scanning electron microscope. A Hitachi Ultrahigh Resolution Field Emission Scanning Electron Microscope S-4800 (product name) is used for the scanning electron microscope.

When fine particles other than the organosilicon polymer fine particles are present in the toner, EDS analysis is performed on each of the external additive particles during toner observation, and whether the analyzed particle is an organosilicon polymer fine particle is scored based on the presence/absence of Si element peaks. In specific terms, the same process is carried out as for the number-average primary particle diameter of the organosilicon polymer fine particles.

The conditions for image acquisition are as follows.

(1) Specimen Preparation

An electroconductive paste is spread in a thin layer on the specimen stub (15 mm×6 mm aluminum specimen stub) and the toner is sprayed onto this. Blowing with air is additionally performed to remove excess toner from the specimen stub and carry out thorough drying. The specimen stub is set in the specimen holder and the specimen stub height is adjusted to 36 mm with the specimen height gauge.

(2) Setting Conditions for Observation with S-4800

The coverage ratio [B] by the organosilicon polymer fine particles is determined using the image obtained by observation of the backscattered electron image with the S-4800. The coverage ratio [B] of the organosilicon polymer fine particles can be measured at good accuracy using the backscattered electron image due to the low charge up in comparison to the two-dimensional electron image.

Liquid nitrogen is introduced to the brim of the anti-contamination trap attached to the S-4800 case body and standing for 30 minutes is carried out. The "PC-SEM" of the S-4800 is started and flashing is performed (the FE tip, which is the electron source, is cleaned). The acceleration voltage display area in the control panel on the screen is clicked and the [Flashing] button is pressed to open the flashing execution dialog. A flashing intensity of 2 is confirmed and execution is carried out. The emission current due to flashing is confirmed to be 20 µA to 40 µA. The specimen holder is inserted in the specimen chamber of the S-4800 case body. [Home] is pressed on the control panel to transfer the specimen holder to the observation position. The acceleration voltage display area is clicked to open the HV setting dialog and the acceleration voltage is set to [0.8 kV] and the emission current is set to [20 µA]. In the [Base] tab of the operation panel, signal selection is set to [SE], [Upper (U)] and [+BSE] are selected for the SE detector, and the instrument is placed in backscattered electron image observation mode by selecting [L. A. 100] in the selection box to the right of [+BSE].

Similarly, in the [Base] tab of the operation panel, the probe current of the electron optical system condition block is set to [Normal]; the focus mode is set to [UHR]; and WD is set to [3.0 mm]. The [ON] button in the acceleration voltage display area of the control panel is pressed to apply the acceleration voltage.

(3) Focus Adjustment

The magnification is set to 5,000× (5 k) by dragging within the magnification indicator area of the control panel. Adjustment of the aperture alignment is carried out when some degree of focus has been obtained in the visual field as a whole by turning the [COARSE] focus knob on the operation panel. [Align] in the control panel is clicked and the alignment dialog is displayed and [Beam] is selected. The displayed beam is migrated to the center of the concentric circles by turning the STIGMA/ALIGNMENT knobs (X, Y) on the operation panel. [Aperture] is then selected and the STIGMA/ALIGNMENT knobs (X, Y) are turned one at a time and adjustment is performed so as to stop the motion of the image or minimize the motion. The aperture dialog is closed and focus is performed with the autofocus. This operation is repeated an additional two time to achieve focus.

Then, with the center point of the largest diameter for the target toner brought to the center of the measurement screen, the magnification is set to 10,000× (10 k) by dragging within the magnification indicator area of the control panel. Adjustment of the aperture alignment is carried out when some degree of focus has been obtained by turning the [COARSE] focus knob on the operation panel. [Align] in the control panel is clicked and the alignment dialog is displayed and [Beam] is selected. The displayed beam is migrated to the center of the concentric circles by turning the STIGMA/ALIGNMENT knobs (X, Y) on the operation panel.

[Aperture] is then selected and the STIGMA/ALIGNMENT knobs (X, Y) are turned one at a time and adjustment is performed so as to stop the motion of the image or minimize the motion. The aperture dialog is closed and focus is performed with the autofocus. The magnification is then set to 50,000× (50 k); focus adjustment is performed as above using the focus knob and the STIGMA/ALIGNMENT knobs; and re-focusing is performed using autofocus. This operation is repeated to achieve focus. The accuracy of measurement of the coverage ratio readily declines when the plane of observation has a large angle of inclination, and for this reason simultaneous focus of the plane of observation as a whole is selected during focus adjustment and the analysis is carried out with selection of the smallest possible surface inclination.

(4) Image Storage

Brightness adjustment is performed using the ABC mode, and a photograph with a size of 640×480 pixels is taken and saved. Analysis is carried out as follows using this image file. One photograph is taken per one toner, and images are obtained for at least 100 or more particles of toner.

The observed image is binarized using ImageJ image processing software (can be obtained from https://imagej.nih.gov/ij/). After binarization, the particle diameter and circularity of the qualifying organosilicon polymer fine particles are set via [Analyze]-[Analyze Particles] and only the organosilicon polymer fine particles are extracted and the coverage ratio (unit: area %) for the organosilicon polymer fine particles on the toner particle is determined.

This measurement is performed on 100 binarized images, and the average value of the coverage ratio (unit: area %) for the organosilicon polymer fine particles is taken to be the coverage ratio [B] for the organosilicon polymer fine particles. The attachment index of the organosilicon polymer fine particles is calculated using the following formula (I) from the area ratio [A] for the organosilicon polymer fine particles on the substrate and the coverage ratio [B] by the organosilicon polymer fine particles.

Attachment index=(Area ratio [A] for the organosilicon polymer fine particles transferred to the polycarbonate film)/(Coverage ratio [B] of the surface of the toner particle by the organosilicon polymer fine particles)×100    (I)

Method for Measuring Coverage Ratio of the Surface of the Toner Particle by Organosilicon Polymer Fine Particles The value (unit: area %) of the coverage ratio [B] of the surface of the toner particle by the organosilicon polymer fine particles in the aforementioned Method for Measuring the Attachment Index of the Organosilicon Polymer Fine Particles is used as the coverage ratio of the surface of the toner particle by the organosilicon polymer fine particles.

Method for Measuring Storage Elastic Modulus E' of Toner

A DMA 8000 (PerkinElmer Inc.) is used for the measurement instrument. A single cantilever (product number: N533-0300) is used for the measurements, and the measurements are carried out using an oven with product number: N533-0267.

First, 50 mg of the toner is exactly weighed out and is introduced into the provided Material Pocket (product number: N533-0322) so the toner is in the center. The mounting fixture is then attached to the geometry shaft such that the mounting fixture straddles the temperature sensor and the distance between the drive shaft and the mounting fixture is 18.0 mm. Clamping with the mounting fixture is then carried out such that the center of the toner-loaded Material Pocket resides at the center between the mounting fixture and the drive shaft, and the measurement is performed.

The measurement wizard is used to set the following measurement conditions for the measurement.

oven: Standard Air Oven
measurement type: frequency scan
deformation mode: single cantilever
frequency: 0.01 Hz to 50 Hz
amplitude: 0.05 mm
measurement interval: 5 points per decade
temperature: 30° C.
cross section: rectangle
test specimen dimensions: length×width×thickness: 17.5 mm×7.5 mm×1.5 mm
data acquisition interval: 0.3 second interval The average value for the individual frequencies provided by this measurement is taken to be the storage elastic modulus E' of the toner.

Method for Measuring Wettability of Organosilicon Polymer Fine Particles Versus Methanol/Water Mixed Solvent The wettability of the organosilicon polymer fine particles is determined from a transmittance-versus-methanol dropwise addition curve that is obtained proceeding as follows.

When the organosilicon polymer fine particles used for external addition can be acquired, the measurement may be performed using same. Separation of the organosilicon polymer fine particles from the toner particle is carried out using the following procedure when the measurement sample is the external additive separated from the toner particle surface.

1) For Nonmagnetic Toner 160 g of sucrose (Kishida Chemical Co., Ltd.) is added to 100 mL of deionized water and a sucrose concentrate is then prepared by dissolving while heating on a hot water bath. 31 g of this sucrose concentrate and 6 mL of Contaminon N are introduced into a centrifugal separation tube to prepare a dispersion. 1 g of the toner is added to this dispersion and the toner clumps are broken up with, e.g., a spatula.

Using the shaker referenced above, the centrifugal separation tube is shaken for 20 minutes under conditions of 350 oscillations per 1 minute. After shaking, the solution is transferred over to a glass tube (50 mL) for swing rotor service, and centrifugal separation is performed with a centrifugal separator (H-9R, Kokusan Co., Ltd.) and conditions of 58.33 $S^{-1}$ for 30 minutes. After centrifugal separation, the toner is present in the uppermost layer in the glass tube and the external additive is present in the aqueous solution side of the lower layer. The aqueous solution of the lower layer is recovered and subjected to centrifugal separation to separate the sucrose and external additive and the external additive is collected. Centrifugal separation is repeated as necessary to bring about a satisfactory separation, and this is followed by drying of the dispersion to collect the organosilicon polymer fine particles.

When several types of external additives are used, the organosilicon polymer fine particles may be selected from the collected external additive using, for example, centrifugal separation.

2) For Magnetic Toner

A dispersion medium is first prepared by introducing 6 mL of Contaminon N (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) into 100 mL of deionized water. 5 g of the toner is added to this dispersion medium and dispersion is carried out for 5 minutes using an ultrasound disperser (VS-150, AS ONE Corporation). This is followed by installation in a "KM Shaker" (model: V. SX) from Iwaki Sangyo Co., Ltd., and shaking is carried out for 20 minutes under conditions of 350 oscillations per 1 minute.

The supernatant is then recovered with the toner particles being retained using a neodymium magnet. The organosilicon polymer fine particles are collected by drying this supernatant. This process is repeated when a sufficient amount of the organosilicon polymer fine particles cannot be collected.

When several types of external additives are used, as in the case of nonmagnetic toner the target organosilicon polymer fine particles are selected from the collected external additive using, for example, centrifugal separation.

60 mL of an aqueous methanol solution prepared from 30 volume % methanol and 70 volume % water is introduced into a cylindrical glass vessel having a diameter of 5 cm and a thickness of 1.75 mm, and dispersion is carried out for 5 minutes with an ultrasound disperser in order to remove, e.g., bubbles and so forth, in this measurement sample.

0.1 g of the organosilicon polymer fine particles is exactly weighed out and is added to the container holding the aqueous methanol solution to prepare the measurement sample liquid.

The measurement sample liquid is installed in a "WET-100P" powder wetting tester (Rhesca Co., Ltd.). The measurement sample liquid is stirred at a rate of 6.7 $s^{-1}$ using a magnetic stirrer. A fluororesin-coated spindle-shaped stir bar having a length of 25 mm and a maximum barrel diameter of 8 mm is used as the stir bar for the magnetic stirrer.

The transmittance for light with a wavelength of 780 nm is measured while continuously adding methanol at a dropwise addition rate of 1.3 mL/minute through the instrument into the measurement sample liquid, and a transmittance-versus-methanol dropwise addition curve is constructed. The methanol concentration when the transmittance is 50% is used as the wettability of the organosilicon polymer fine particles.

Method for Measuring Weight-Average Particle Diameter (D4) of Toner Particle

The weight-average particle diameter (D4) of the toner particle is calculated as shown below. A precision particle diameter distribution measurement apparatus "Coulter Counter Multisizer 3" (registered trademark, by Beckman Coulter, Inc.) relying on a pore electrical resistance method and equipped with a 100 μm aperture tube is used as a measurement apparatus. A dedicated software "Beckman Coulter Multisizer 3, Version 3.51" (by Beckman Coulter, Inc.) ancillary to the apparatus, is used for setting measurement conditions and analyzing measurement data. Measurements are performed in 25,000 effective measurement channels.

The aqueous electrolyte solution used in the measurements can be prepared through dissolution of special-grade sodium chloride at a concentration of about 1 mass % in ion-exchanged water; for instance "ISOTON II" (by Beckman Coulter, Inc.) can be used herein.

The dedicated software was set up as follows prior to measurement and analysis.

In the "Changing Standard Operating Mode (SOMME)" screen of the dedicated software, a total count of the control mode is set to 50,000 particles, a number of runs is set to one, and a Kd value is set to a value obtained using "Standard particles 10.0 μm" (by Beckman Coulter, Inc.). The "threshold/noise level measuring button" is pressed to thereby automatically set a threshold value and a noise level. Then the current is set to 1600 μA, the gain is set to 2, the electrolyte solution is set to ISOTON II, and "flushing of the aperture tube following measurement" is ticked.

In the "setting conversion from pulses to particle size" screen of the dedicated software, the bin interval is set to a logarithmic particle diameter, the particle diameter bin is set to 256 particle diameter bins, and the particle diameter range is set to range from 2 μm to 60 μm.

Specific measurement methods are as described below.

(1) Herein about 200 mL of the aqueous electrolyte solution is placed in a 250 mL round-bottomed glass beaker dedicated to Multisizer 3. The beaker is set on a sample stand and is stirred counterclockwise with a stirrer rod at 24 rotations per second. Debris and air bubbles are then removed from the aperture tube by the "aperture tube flush" function of the dedicated software.

(2) Then about 30 mL of the aqueous electrolyte solution is placed in a 100 mL flat-bottomed glass beaker, and about 0.3 mL of a dilution obtained by diluting "Contaminon N" (10 mass % aqueous solution of a pH 7 neutral detergent for cleaning of precision instruments, comprising a nonionic surfactant, an anionic surfactant and an organic builder, by Wako Pure Chemical Industries, Ltd.) thrice by mass in ion-exchanged water is added thereto as a dispersant.

(3) About 3.3 L of ion-exchanged water is placed in a water tank of an ultrasonic disperser (Ultrasonic Dispersion System Tetora 150; Nikkaki Bios Co., Ltd.) having an electrical output of 120 W and internally equipped with two oscillators that oscillate at a frequency of 50 kHz and are disposed at a phase offset of 180 degrees, and about 2 mL of the above Contaminon N are added into the water tank.

(4) The beaker of (2) is set in a beaker-securing hole of the ultrasonic disperser, which is then operated. The height position of the beaker is adjusted so as to maximize a resonance state at the liquid level of the aqueous electrolyte solution in the beaker.

(5) With the aqueous electrolyte solution in the beaker of (4) being ultrasonically irradiated, about 10 mg of the toner particle are added little by little to the aqueous electrolyte solution, to be dispersed therein. The ultrasonic dispersion treatment is further continued for 60 seconds. The water temperature of the water tank at the time of ultrasonic dispersion is adjusted as appropriate to lie in the range of from 10° C. to 40° C.

(6) The aqueous electrolyte solution of (5) containing the dispersed toner is added dropwise, using a pipette, to the round-bottomed beaker of (1) set on the sample stand, to adjust the measurement concentration to about 5%. A measurement is then performed until the number of measured particles reaches 50,000.

(7) Measurement data is analyzed using the dedicated software ancillary to the apparatus, to calculate the weight-average particle diameter (D4). The "average diameter" in the "analysis/volume statistics (arithmetic average)" screen, when graph/% by volume is selected in the dedicated software, yields herein the weight-average particle diameter (D4).

Measuring Glass Transition Temperature (Tg) of Toner Particles

The glass transition temperature of the toner particles is measured using a "Q1000" differential scanning calorimeter (TA Instruments) in accordance with ASTM D 3418-82.

Temperature correction in the instrument detection section is performed using the melting points of indium and zinc, and the amount of heat is corrected using the heat of fusion of indium. Specifically, 5 mg of the sample is exactly weighed out and this is introduced into an aluminum pan; an empty aluminum pan is used for reference. The sample is submitted to measurement at a ramp rate of 10° C./min in a measurement temperature range of 30° C. to 200° C. For the measurement, the temperature is once raised to 200° C. and is then reduced at a ramp down rate of 10° C./min to 30° C.; this is followed by reheating at a ramp rate of 10° C./min.

For the DSC curve obtained in this second heating step, the glass transition temperature (Tg) is taken to be the point in this DSC curve at the intersection between the DSC curve and the line for the midpoint for the baselines for prior to and subsequent to the appearance of the change in the specific heat.

EXAMPLES

The present invention is described in greater detail in the following using examples and comparative examples; however, the present invention is in no way limited to or by these. Unless specifically indicated otherwise, the parts used in the examples is on a mass basis.

Examples of toner production are described in the following.

Toner Particle 1 Production Example 710 parts of deionized water and 850 parts of a 0.1 mol/liter aqueous $Na_3PO_4$ solution were added to a four-neck vessel and were held at 60° C. while stirring at 2,000 rotations/sec using a T. K. Homomixer high-speed stirrer (Tokushu Kika Kogyo Co., Ltd.). To this was gradually added 68 parts of a 1.0 mol/liter aqueous $CaCl_2$ solution to prepare an aqueous dispersion medium that contained a dispersion stabilizer.

| | |
|---|---|
| styrene | 124 parts |
| n-butyl acrylate | 36 parts |
| copper phthalocyanine pigment (C.I. Pigment Blue 15:3) | 13 parts |
| polyester resin (terephthalic acid-propylene oxide-modified bisphenol A (2 mol adduct) copolymer, acid value: 10 mg KOH/g, glass transition temperature (Tg): 70° C., weight-average molecular weight (Mw): 20,000) | 10 parts |
| negative charge control agent (aluminum compound of 3.5-tert-butylsalicylic acid) | 0.8 parts |
| Fischer-Tropsch wax (endothermic main peak temperature: 78° C.) | 15 parts |

These materials were stirred for 3 hours using an attritor (Nippon Coke & Engineering Co., Ltd.) to disperse the individual components in the polymerizable monomer and prepare a monomer mixture. 20.0 parts (50% toluene solution) of the polymerization initiator 1,1,3,3-tetramethylbutyl peroxy-2-ethylhexanoate was added to the monomer mixture to prepare a polymerizable monomer composition.

The polymerizable monomer composition was introduced into the aqueous dispersion medium and was granulated for 5 minutes while maintaining the rotation rate of the stirrer at 10,000 rpm. The high-speed stirrer was then exchanged for a propeller-type stirrer and the internal temperature was raised to 70° C. and a reaction was run for 6 hours while gently stirring.

The temperature in the vessel was then raised to 80° C. and this was maintained for 4 hours, followed by cooling to obtain a slurry 1. Dilute hydrochloric acid was added to the container holding the slurry 1 to remove the dispersion stabilizer. Filtration, washing, and drying then yielded polymer particles (toner particle 1) having a weight-average particle diameter (D4) of 6.2 and a glass transition temperature (Tg) of 61° C.

Toner Particle 2 Production Example

Toner particle 2 was obtained proceeding as in the Toner Particle 1 Production Example, but changing the weight-average molecular weight (Mw) of the polyester resin of the Toner Particle 1 Production Example to 15,000. Toner particle 2 had a weight-average particle diameter (D4) of 6.4 μm and a glass transition temperature (Tg) of 61° C.

Toner Particle 3 Production Example

Toner particle 3 was obtained proceeding as in the Toner Particle 1 Production Example, but changing the weight-average molecular weight (Mw) of the polyester resin of the Toner Particle 1 Production Example to 8,000. Toner particle 3 had a weight-average particle diameter (D4) of 6.3 μm and a glass transition temperature (Tg) of 60° C.

Fine Particles A1 Production Example

Step 1

360 parts of water was introduced into a reactor fitted with a thermometer and a stirrer and 15.0 parts of hydrochloric acid having a concentration of 5.0 mass % was added and a uniform solution was prepared. While stirring this at a temperature of 25° C., 136.0 parts of methyltrimethoxysilane was added and stirring was carried out for 5 hours. This was followed by filtration to obtain a transparent reaction solution that contained a silanol compound or partial condensate thereof.

Step 2

540 parts of water was introduced into a reactor fitted with a thermometer, stirrer, and dropwise addition apparatus, and 17.0 parts of aqueous ammonia with a concentration of 10.0 mass % was added and a uniform solution was prepared. While stirring this at a temperature of 35° C., 100 parts of the reaction solution obtained in step 1 was added dropwise over 0.50 hour and stirring was performed for 6 hours to obtain a fine particle dispersion.

Step 3

5 parts of hexamethyldisilazane was added as a hydrophobic treatment agent to the obtained fine particle dispersion and stirring was performed for 48 hours at 25° C., at which point a powder suspension was obtained in which a powder of hydrophobic spherical fine particles was floating in the upper layer region of the liquid. The powder, which floated to the surface after standing at quiescence for 5 minutes, was recovered by suction filtration and was dried at reduced pressure for 24 hours at 100° C. to obtain a dry powder in the form of white spherical hydrophobic polymethylsilsesquioxane fine particles.

Step 4

The obtained white spherical hydrophobic polymethylsilsesquioxane fine particles were spread out into a thin layer on a stainless steel tray and were then exposed for 30 minutes to ultraviolet radiation having a peak wavelength of 172 nm using an excimer irradiation unit (Ushio Inc.) to obtain fine particles A1. The properties of the obtained fine particles A1 are given in Table 1.

Fine Particles A12 Production Example

Step 1

360 parts of water was introduced into a reactor fitted with a thermometer and a stirrer and 17.0 parts of hydrochloric acid having a concentration of 5.0 mass % was added and a uniform solution was prepared. While stirring this at a temperature of 25° C., 136.0 parts of methyltrimethoxysilane was added and stirring was carried out for 5 hours. This was followed by filtration to obtain a transparent reaction solution that contained a silanol compound or partial condensate thereof.

Step 2

540 parts of water and 1,500 parts of methanol were introduced into a reactor fitted with a thermometer, stirrer, and dropwise addition apparatus, and 19.0 parts of aqueous ammonia having a concentration of 19.0 mass % was added and a uniform solution was prepared. While stirring this at a temperature of 30° C., 100 parts of the reaction solution obtained in step 1 was added dropwise over 0.35 hour and stirring was performed for 6 hours to obtain a fine particle dispersion. The obtained suspension was introduced into a centrifugal separator and the fine particles were sedimented and recovered and dried for 24 hours in a dryer at a temperature of 200° C. to obtain white spherical polymethylsilsesquioxane fine particles.

Step 3

The obtained white spherical polymethylsilsesquioxane fine particles were spread out into a thin layer on a stainless steel tray and were then exposed for 30 minutes to ultraviolet radiation having a peak wavelength of 172 nm using an excimer irradiation unit (Ushio Inc.) to obtain fine particles A12. The properties of the obtained fine particles A12 are given in Table 1.

Fine Particle A13 Production Example

Step 1

360 parts of water was introduced into a reactor fitted with a thermometer and a stirrer and 17.0 parts of hydrochloric acid having a concentration of 5.0 mass % was added and a uniform solution was prepared. While stirring this at a temperature of 25° C., 136.0 parts of methyltrimethoxysilane was added and stirring was carried out for 5 hours. This was followed by filtration to obtain a transparent reaction solution that contained a silanol compound or partial condensate thereof.

Step 2

540 parts of water was introduced into a reactor fitted with a thermometer, stirrer, and dropwise addition apparatus, and 19.0 parts of aqueous ammonia with a concentration of 10.0 mass % was added and a uniform solution was prepared. While stirring this at a temperature of 30° C., 100 parts of the reaction solution obtained in step 1 was added dropwise over 0.35 hour and stirring was performed for 6 hours to obtain a fine particle dispersion.

Step 3

5 parts of hexamethyldisilazane was added as a hydrophobic treatment agent to the obtained fine particle dispersion and stirring was performed for 48 hours at 25° C., at which point a powder suspension was obtained in which a powder of hydrophobic spherical fine particles was floating in the upper layer region of the liquid. The powder, which floated to the surface after standing at quiescence for 5 minutes, was recovered by suction filtration and was dried at reduced pressure for 24 hours at 100° C. to obtain a dry powder in the form of white spherical hydrophobic polymethylsilsesquioxane fine particles.

Step 4

The obtained white spherical hydrophobic polymethylsilsesquioxane fine particles were treated for 15 minutes with a Plamino powder atmospheric pressure plasma treatment device (Kyushu Keisokki Co., Ltd.) to obtain fine particles A13. The properties of the obtained fine particles A13 are given in Table 1.

Fine Particles A17 Production Example

Step 1

360 parts of water was introduced into a reactor fitted with a thermometer and a stirrer and 15.0 parts of hydrochloric acid having a concentration of 5.0 mass % was added and a uniform solution was prepared. While stirring this at a temperature of 25° C., 136.0 parts of methyltrimethoxysilane was added and stirring was carried out for 5 hours. This was followed by filtration to obtain a transparent reaction solution that contained a silanol compound or partial condensate thereof.

Step 2

540 parts of water was introduced into a reactor fitted with a thermometer, stirrer, and dropwise addition apparatus, and 17.0 parts of aqueous ammonia having a concentration of 10.0 mass % was added and a uniform solution was prepared. While stirring this at a temperature of 35° C., 100 parts of the reaction solution obtained in step 1 was added dropwise over 0.50 hour and stirring was performed for 6 hours to obtain a fine particle dispersion. The obtained suspension was introduced into a centrifugal separator (10,000 rpm, 30 min) and the fine particles were sedimented and recovered and dried for 24 hours in a dryer at a temperature of 200° C. to obtain fine particles A17.

Production Example for Fine Particles A2 to a11 and A14 and Fine Particles 15 and 16

Particles A2 to A11 and A14 and fine particles 15 and 16 were obtained proceeding as in the Fine Particles A1 Production Example, but changing the silane compound, starting reaction temperature, amount of catalyst addition, duration of dropwise addition, drying time, duration of ultraviolet treatment, and so forth as shown in Table 1. The properties of the obtained fine particles A2 to A11 and A14 and fine particles 15 and 16 are given in Table 1.

TABLE 1

| | | | Step 1 | | | | | | |
|---|---|---|---|---|---|---|---|---|---|
| Fine particle | water parts | hydrochloric acid parts | reaction temperature °C. | silane compound A name | parts | silane compound B name | parts | silane compound C name | parts |
| A1 | 360 | 15.0 | 25 | methyltrimethoxysilane | 136.0 | — | — | — | — |
| A2 | 360 | 17.0 | 25 | methyltrimethoxysilane | 136.0 | — | — | — | — |
| A3 | 360 | 13.0 | 25 | methyltrimethoxysilane | 136.0 | — | — | — | — |
| A4 | 360 | 25.0 | 25 | methyltrimethoxysilane | 136.0 | — | — | — | — |
| A5 | 360 | 12.0 | 25 | methyltrimethoxysilane | 136.0 | — | — | — | — |
| A6 | 360 | 16.0 | 25 | phenyltrimethoxysilane | 136.0 | — | — | — | — |
| A7 | 360 | 16.0 | 25 | methyltrimethoxysilane | 122.4 | trimethylmethoxysilane | 10.4 | dimethyldimethoxysilane | 6.0 |
| A8 | 360 | 16.0 | 25 | methyltrimethoxysilane | 115.6 | trimethylmethoxysilane | 10.4 | dimethyldimethoxysilane | 6.0 |
| A9 | 360 | 16.0 | 25 | methyltrimethoxysilane | 163.2 | trimethylmethoxysilane | 8.0 | tetraethoxysilane | 20.4 |
| A10 | 360 | 14.2 | 25 | methyltrimethoxysilane | 136.0 | — | — | — | — |
| A11 | 360 | 14.2 | 25 | methyltrimethoxysilane | 136.0 | — | — | — | — |
| A12 | 360 | 17.0 | 25 | methyltrimethoxysilane | 136.0 | — | — | — | — |
| A13 | 360 | 17.0 | 25 | methyltrimethoxysilane | 136.0 | — | — | — | — |
| A14 | 360 | 16.0 | 25 | phenyltrimethoxysilane | 136.0 | — | — | — | — |
| 15 | 360 | 11.0 | 25 | methyltrimethoxysilane | 136.0 | — | — | — | — |
| 16 | 360 | 28.0 | 25 | methyltrimethoxysilane | 136.0 | — | — | — | — |
| A17 | 360 | 15.0 | 25 | methyltrimethoxysilane | 136.0 | — | — | — | — |

| | Step 2 | | | | | Step 3 | | | | |
|---|---|---|---|---|---|---|---|---|---|---|
| Fine particle | reaction solution obtained in step 1 parts | water parts | aqueous ammonia parts | starting reaction temperature °C. | duration of dropwise addition hours | hydrophobic treatment agent type | parts | reaction temperature °C. | reaction time hours | drying temperature °C. | drying time hours |
| A1 | 100 | 540 | 17.0 | 35 | 0.50 | HMDS | 5 | 25 | 48 | 100 | 24 |
| A2 | 100 | 540 | 19.0 | 30 | 0.35 | HMDS | 5 | 25 | 48 | 100 | 24 |
| A3 | 100 | 540 | 15.0 | 42 | 1.00 | HMDS | 5 | 25 | 48 | 100 | 24 |
| A4 | 100 | 540 | 25.0 | 30 | 0.15 | HMDS | 5 | 25 | 48 | 100 | 24 |
| A5 | 100 | 540 | 14.0 | 45 | 1.10 | HMDS | 5 | 25 | 48 | 100 | 24 |
| A6 | 100 | 540 | 18.0 | 32 | 0.40 | HMDS | 5 | 25 | 48 | 100 | 24 |
| A7 | 100 | 540 | 18.0 | 32 | 0.40 | HMDS | 5 | 25 | 48 | 100 | 24 |
| A8 | 100 | 540 | 18.0 | 32 | 0.40 | HMDS | 5 | 25 | 48 | 100 | 24 |
| A9 | 100 | 540 | 18.0 | 32 | 0.40 | HMDS | 5 | 25 | 48 | 100 | 24 |
| A10 | 100 | 540 | 16.2 | 37 | 0.70 | HMDS | 5 | 25 | 48 | 200 | 24 |
| A11 | 100 | 540 | 16.2 | 37 | 0.70 | HMDS | 5 | 25 | 48 | 100 | 12 |
| A12 | 100 | 540 | 19.0 | 30 | 0.35 | — | — | — | — | — | — |
| A13 | 100 | 540 | 19.0 | 30 | 0.35 | HMDS | 5 | 25 | 48 | 100 | 24 |
| A14 | 100 | 540 | 18.0 | 32 | 0.40 | HMDS | 5 | 25 | 48 | 100 | 24 |
| 15 | 100 | 540 | 13.0 | 49 | 1.20 | HMDS | 7 | 25 | 48 | 100 | 24 |
| 16 | 100 | 540 | 28.0 | 30 | 0.12 | HMDS | 3 | 25 | 48 | 100 | 24 |
| A17 | 100 | 540 | 17.0 | 35 | 0.50 | — | — | — | — | — | — |

| | | Step 4 | | |
|---|---|---|---|---|
| Fine particle | number-average particle diameter (nm) | method | duration of treatment minutes | wettability (volume %) |
| A1 | 100 | ultraviolet | 30 | 63 |
| A2 | 145 | ultraviolet | 30 | 63 |
| A3 | 45 | ultraviolet | 30 | 67 |
| A4 | 450 | ultraviolet | 30 | 63 |
| A5 | 35 | ultraviolet | 45 | 68 |
| AS | 120 | ultraviolet | 30 | 68 |
| A7 | 120 | ultraviolet | 30 | 52 |
| A8 | 120 | ultraviolet | 30 | 53 |
| A9 | 120 | ultraviolet | 30 | 62 |
| A10 | 80 | ultraviolet | 30 | 65 |
| A11 | 80 | ultraviolet | 30 | 65 |
| A12 | 145 | ultraviolet | 30 | 45 |
| A13 | 145 | plasma | 15 | 68 |
| A14 | 120 | — | — | 75 |
| 15 | 20 | ultraviolet | 30 | 68 |
| 16 | 600 | ultraviolet | 30 | 66 |
| A17 | 100 | — | — | 46 |

*HMDS: hexamethyldisilazane

Other Additives

Besides the aforementioned fine particles A1 to A14 and A17 and fine particles 15 and 16, a styrene-2-ethylhexyl acrylate-methyl methacrylate-methacrylic acid copolymer having a methanol wettability of 55% and a number-average primary particle diameter of 150 µm was used as resin fine particles 1.

Mixing Treatment Apparatus 1

The mixing treatment apparatus 1 shown in FIG. 2 was used. The apparatus used had a diameter of 130 mm for the inner circumference of the main casing 31 and had a volume for the treatment space 39 of $2.0 \times 10^{-3}$ m$^3$; the nominal power from the drive member 38 was 5.5 kW; and the stirring member 33 had the shape shown in FIG. 3. In addition, the overlapping width d between a stirring member 33a and a stirring member 33b in FIG. 3 was 0.25D with reference to the maximum width D of the stirring member 33, and the clearance between the stirring member 33 and the inner circumference of the main casing 31 was 3.0 mm. The temperature was regulated by the flow of a heat transfer medium in the jacket.

Mixing Treatment Apparatus 2

An FM mixer (FM10C, Nippon Coke & Engineering Co., Ltd.) was used.

Toner 1 Production Example

External Addition Step

Using the mixing treatment apparatus 2, 100 parts of toner particle 1 and 1.0 parts of fine particles A1 were mixed for 3 minutes at a rotation rate of 3,600 rpm. Mixing was begun after the temperature had been stabilized at 30° C., and regulation was performed so as to maintain 30° C.±1° C. during mixing.

Heating Step

Hot water was then injected through the jacket of the mixing treatment apparatus 1 constituted as described above to bring its temperature to 55° C. Mixing was begun after the temperature had been stabilized at 55° C., and regulation was performed so as to maintain 55° C.±1° C. during mixing.

After the introduction into the mixing treatment apparatus 1 of the aforementioned toner that had been subjected to external addition, a heat treatment was performed for 10 minutes while adjusting the peripheral velocity of the outermost end of the stirring member 33 such that the power from the drive member 38 was maintained constant at $1.5 \times 10^{-2}$ W/g (rotation rate for the drive member 38: 150 rpm).

After the completion of the heat treatment, sieving was done on a mesh with an aperture of 75 µm to obtain toner 1. The production conditions for toner 1 are given in Table 2, and the properties of toner 1 are given in Table 3.

Production of Toners 2 to 20 and Comparative Toners 1 to 6

Toners 2 to 20 and comparative toners 1 to 6 were obtained proceeding as in the production of toner 1, but using in toner 1 production the toner particle, fine particles, mixing treatment apparatus, and production conditions shown in Table 2. The properties of toners 2 to 20 and comparative toners 1 to 6 are given in Table 3.

TABLE 2

| | Toner particle | No. | Fine particles amount of addition (parts) | External addition step apparatus | conditions | temp. (° C.) | Heating step apparatus | conditions | mixing treatment energy E (W·h/g) | temp. (° C.) |
|---|---|---|---|---|---|---|---|---|---|---|
| Toner 1 | 1 | A1 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 2 | 1 | A2 | 1.2 | mixing treatment apparatus 2 | 3600 rpm × 5 min | 50 | mixing treatment apparatus 1 | 150 rpm × 10 min | $2.5 \times 10^{-3}$ | 55 |
| Toner 3 | 1 | A3 | 0.5 | mixing treatment apparatus 2 | 3600 rpm × 3 min | 30 | mixing treatment apparatus 1 | 150 rpm × 10 min | $2.5 \times 10^{-3}$ | 55 |
| Toner 4 | 2 | A4 | 3.0 | mixing treatment apparatus 2 | 3600 rpm × 5 min | 50 | mixing treatment apparatus 1 | 150 rpm × 10 min | $2.5 \times 10^{-3}$ | 55 |
| Toner 5 | 1 | A5 | 0.5 | mixing treatment apparatus 2 | 3600 rpm × 3 min | 30 | mixing treatment apparatus 1 | 150 rpm × 10 min | $2.5 \times 10^{-3}$ | 55 |
| Toner 6 | 1 | A2 | 1.2 | mixing treatment apparatus 2 | 3600 rpm × 3 min | 30 | mixing treatment apparatus 1 | 150 rpm × 7 min | $1.75 \times 10^{-3}$ | 55 |
| Toner 7 | 2 | A3 | 0.5 | mixing treatment apparatus 2 | 3600 rpm × 12 min | 55 | — | — | — | — |
| Toner 8 | 1 | A2 | 1.2 | mixing treatment apparatus 2 | 3600 rpm × 5 min | 30 | mixing treatment apparatus 1 | 150 rpm × 15 min | $3.75 \times 10^{-3}$ | 55 |
| Toner 9 | 1 | A6 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 10 | 1 | A7 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 11 | 1 | A1 | 0.1 | mixing treatment apparatus 2 | 3600 rpm × 3 min | 30 | mixing treatment apparatus 1 | 150 rpm × 10 min | $2.5 \times 10^{-3}$ | 55 |

TABLE 2-continued

| | Toner particle No. | Fine particles No. | amount of addition (parts) | External addition step apparatus | External addition step conditions | temp. (° C.) | Heating step apparatus | Heating step conditions | mixing treatment energy E (W · h/g) | temp. (° C.) |
|---|---|---|---|---|---|---|---|---|---|---|
| Toner 12 | 1 | A1 | 1.8 | mixing treatment apparatus 2 | 3600 rpm × 3 min | 30 | mixing treatment apparatus 1 | 150 rpm × 10 min | $2.5 \times 10^{-3}$ | 55 |
| Toner 13 | 3 | A1 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 14 | 1 | A8 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 15 | 1 | A9 | 1.0 | mixing treatment apparatus 2 | 3600 rpm × 3 min | 30 | mixing treatment apparatus 1 | 150 rpm × 10 min | $2.5 \times 10^{-3}$ | 55 |
| Toner 16 | 1 | A10 | 0.8 | mixing treatment apparatus 2 | 3600 rpm × 3 min | 30 | mixing treatment apparatus 1 | 150 rpm × 10 min | $2.5 \times 10^{-3}$ | 55 |
| Toner 17 | 1 | A11 | 0.8 | mixing treatment apparatus 2 | 3600 rpm × 3 min | 30 | mixing treatment apparatus 1 | 150 rpm × 10 min | $2.5 \times 10^{-3}$ | 55 |
| Toner 18 | 1 | A12 | 1.2 | mixing treatment apparatus 2 | 3600 rpm × 3 min | 30 | mixing treatment apparatus 1 | 150 rpm × 10 min | $2.5 \times 10^{-3}$ | 55 |
| Toner 19 | 1 | A13 | 1.2 | mixing treatment apparatus 2 | 3600 rpm × 3 min | 30 | mixing treatment apparatus 1 | 150 rpm × 7 min | $1.75 \times 10^{-3}$ | 55 |
| Toner 20 | 1 | A14 | 1.0 | mixing treatment apparatus 2 | 3600 rpm × 3 min | 30 | mixing treatment apparatus 1 | 150 rpm × 10 min | $2.5 \times 10^{-3}$ | 55 |
| Comparative toner 1 | 1 | 15 | 0.2 | mixing treatment apparatus 2 | 3600 rpm × 10 min | 30 | — | — | — | — |
| Comparative toner 2 | 2 | 16 | 5.0 | mixing treatment apparatus 2 | 3600 rpm × 12 min | 30 | mixing treatment apparatus 1 | 150 rpm × 10 min | $2.5 \times 10^{-3}$ | 45 |
| Comparative toner 3 | 1 | A17 | 1.0 | mixing treatment apparatus 2 | 3600 rpm × 10 min | 30 | — | — | — | — |
| Comparative toner 4 | 1 | A4 | 3.0 | mixing treatment apparatus 2 | 360 0rpm × 3 min | 30 | mixing treatment apparatus 1 | 150 rpm × 10 min | $2.5 \times 10^{-3}$ | 55 |
| Comparative toner 5 | 2 | A5 | 0.5 | mixing treatment apparatus 2 | 4000 rpm × 12 min | 58 | — | — | — | — |
| Comparative toner 6 | 1 | * | 1.5 | mixing treatment apparatus 2 | 3600 rpm × 5 min | 50 | mixing treatment apparatus 1 | 150 rpm × 10 min | $2.5 \times 10^{-3}$ | 55 |

*: resin fine particles 1

TABLE 3

| | Attachment index | b/(b + m) | coverage ratio (%) | storage elastic modulus E' (Pa) | * (X) | T2/T3 |
|---|---|---|---|---|---|---|
| Toner 1 | 2.5 | 0.10 | 30 | $1.5 \times 10^9$ | 1.00 | 0.30 |
| Toner 2 | 2.9 | 0.09 | 25 | $1.5 \times 10^9$ | 1.00 | 0.28 |
| Toner 3 | 1.8 | 0.16 | 35 | $1.5 \times 10^9$ | 1.00 | 0.32 |
| Toner 4 | 3.1 | 0.07 | 20 | $1.0 \times 10^9$ | 1.00 | 0.26 |
| Toner 5 | 2.7 | 0.19 | 40 | $1.5 \times 10^9$ | 1.00 | 0.34 |
| Toner 6 | 3.4 | 0.09 | 25 | $1.5 \times 10^9$ | 1.00 | 0.28 |
| Toner 7 | 1.5 | 0.37 | 35 | $1.0 \times 10^9$ | 1.00 | 0.32 |
| Toner 8 | 3.2 | 0.06 | 25 | $1.5 \times 10^9$ | 1.00 | 0.28 |
| Toner 9 | 2.9 | 0.11 | 25 | $1.5 \times 10^9$ | 1.00 | 0.36 |
| Toner 10 | 2.9 | 0.12 | 25 | $1.5 \times 10^9$ | 0.86 | 0.35 |
| Toner 11 | 2.5 | 0.10 | 3 | $1.5 \times 10^9$ | 1.00 | 0.30 |
| Toner 12 | 2.5 | 0.10 | 55 | $1.0 \times 10^9$ | 1.00 | 0.30 |
| Toner 13 | 2.5 | 0.15 | 30 | $8.0 \times 10^7$ | 1.00 | 0.30 |
| Toner 14 | 3.3 | 0.07 | 25 | $1.5 \times 10^9$ | 0.85 | 0.45 |
| Toner 15 | 2.5 | 0.15 | 25 | $1.5 \times 10^9$ | 0.85 | 0.22 |
| Toner 16 | 2.3 | 0.18 | 30 | $1.5 \times 10^9$ | 1.00 | 0.17 |
| Toner 17 | 2.7 | 0.09 | 30 | $1.0 \times 10^9$ | 1.00 | 0.65 |
| Toner 18 | 2.9 | 0.09 | 25 | $1.5 \times 10^9$ | 1.00 | 0.28 |
| Toner 19 | 3.4 | 0.09 | 25 | $1.5 \times 10^9$ | 1.00 | 0.28 |
| Toner 20 | 3.2 | 0.11 | 25 | $1.5 \times 10^9$ | 1.00 | 0.40 |
| Comparative toner 1 | 1.8 | 0.11 | 35 | $1.0 \times 10^9$ | 1.00 | 0.34 |
| Comparative toner 2 | 3.4 | 0.08 | 25 | $1.5 \times 10^9$ | 1.00 | 0.25 |
| Comparative toner 3 | 3.8 | 0.08 | 30 | $1.5 \times 10^9$ | 1.00 | 0.30 |
| Comparative toner 4 | 3.3 | 0.04 | 20 | $1.5 \times 10^9$ | 1.00 | 0.26 |

TABLE 3-continued

| | Attachment index | b/(b + m) | coverage ratio (%) | storage elastic modulus E' (Pa) | * (X) | T2/T3 |
|---|---|---|---|---|---|---|
| Comparative toner 5 | 1.0 | 0.50 | 40 | $1.5 \times 10^9$ | 1.00 | 0.34 |
| Comparative toner 6 | 1.0 | 0.25 | 40 | $1.5 \times 10^9$ | — | — |

* numerical proportion for units derived from trifunctional silane

Example 1

Toner 1 was filled into a cartridge for an LBP652C laser printer from Canon, Inc. and the following evaluations were performed. The results of the evaluations are given in Table 4.

Evaluation of Image Density

The image density was evaluated in a high-temperature, high-humidity environment (30.0° C., 80% relative humidity), which facilitates a reduction in toner flowability. The evaluation was performed as follows, postulating this as an extended stoppage test.

A total of 10 prints of a horizontal line pattern having a 1% print percentage were output, followed by the output of an image density check image. The machine was then stopped for 5 days, after which time the image density check image was output again. A4 Color Laser Copy paper (Canon, Inc., 80 g/m²) was used. The image density check image was a 5 mm×5 mm solid black patch image, and the measurement was performed by measuring the reflection density using an SPI filter with a MacBeth densitometer (MacBeth Corporation), which is a reflection densitometer. Large numerical values are indicative of a better development performance.

The same evaluation was also performed after the output of 10,000 prints of the horizontal line pattern having a 1% print percentage.
A: The image density is at least 1.45.
B: The image density is from 1.40 to 1.44.
C: The image density is from 1.35 to 1.39.
D: The image density is not more than 1.34.

Evaluation of Scattering

The evaluation of scattering was an evaluation of the scattering at very fine lines, which relates to the image quality of graphical images. A 1 dot-line image, with which scattering occurs more readily, was printed out, and the line reproducibility and scattering in the neighborhood around the lines were visually evaluated. This evaluation was carried out in a low-temperature, low-humidity environment (temperature of 10° C., 14% relative humidity), which is a severe environment for the toner from the standpoint of charging performance and flowability, and was performed after 100 prints of a horizontal line pattern with a 1% print percentage had been made in order to provide a condition in which the toner was satisfactorily mobilized.
A: Almost no scattering is produced, and an excellent line reproducibility is displayed.
B: Minor scattering is observed.
C: Scattering is observed, but there is little effect on the line reproducibility.
D: Significant scattering is observed and the line reproducibility is degraded.

Examples 2 to 20 and Comparative Examples 1 to 6

Evaluations were performed as in Example 1. The results of the evaluations are given in Table 4.

TABLE 4

| | | Image density | | | | |
| | | Initial | | after 10,000 prints | | |
| | Toner used | before 5-day stoppage | after 5-day stoppage | before 5-day stoppage | after 5-day stoppage | scattering |
|---|---|---|---|---|---|---|
| Example 1 | toner 1 | A 1.49 | A 1.49 | A 1.47 | A 1.47 | A |
| Example 2 | toner 2 | A 1.47 | A 1.47 | A 1.46 | A 1.46 | A |
| Example 3 | toner 3 | A 1.48 | A 1.46 | A 1.45 | B 1.44 | A |
| Example 4 | toner 4 | A 1.45 | B 1.43 | B 1.43 | B 1.41 | A |
| Example 5 | toner 5 | A 1.46 | B 1.43 | B 1.43 | B 1.41 | B |
| Example 6 | toner 6 | A 1.46 | B 1.41 | B 1.41 | C 1.37 | B |
| Example 7 | toner 7 | A 1.45 | B 1.4 | B 1.4 | C 1.36 | B |
| Example 8 | toner 8 | B 1.44 | B 1.42 | C 1.39 | C 1.37 | B |
| Example 9 | toner 9 | B 1.44 | B 1.42 | B 1.41 | C 1.39 | B |
| Example 10 | toner 10 | B 1.4 | C 1.38 | C 1.38 | C 1.36 | B |
| Example 11 | toner 11 | B 1.42 | C 1.38 | C 1.38 | C 1.35 | C |
| Example 12 | toner 12 | B 1.44 | B 1.42 | B 1.42 | B 1.4 | C |
| Example 13 | toner 13 | A 1.46 | B 1.4 | C 1.39 | C 1.35 | A |
| Example 14 | toner 14 | C 1.39 | C 1.37 | C 1.38 | C 1.36 | B |
| Example 15 | toner 15 | C 1.39 | C 1.36 | C 1.38 | C 1.35 | B |
| Example 16 | toner 16 | B 1.44 | C 1.39 | B 1.4 | C 1.36 | B |
| Example 17 | toner 17 | B 1.42 | C 1.39 | B 1.4 | C 1.37 | C |
| Example 18 | toner 18 | C 1.39 | C 1.36 | C 1.38 | C 1.35 | B |
| Example 19 | toner 19 | B 1.44 | B 1.4 | B 1.4 | C 1.36 | B |
| Example 20 | toner 20 | B 1.43 | B 1.4 | C 1.39 | C 1.35 | B |
| Comparative Example 1 | comparative toner 1 | A 1.45 | B 1.41 | C 1.39 | C 1.36 | D |
| Comparative Example 2 | comparative toner 2 | B 1.44 | C 1.39 | D 1.34 | D 1.28 | C |
| Comparative Example 3 | comparative toner 3 | B 1.43 | D 1.34 | C 1.35 | D 1.25 | D |
| Comparative Example 4 | comparative toner 4 | B 1.42 | D 1.33 | C 1.36 | D 1.28 | D |

TABLE 4-continued

| | | Image density | | | | | | |
|---|---|---|---|---|---|---|---|---|
| | | Initial | | after 10,000 prints | | | | |
| | Toner used | before 5-day stoppage | after 5-day stoppage | before 5-day stoppage | after 5-day stoppage | scattering | | |
| Comparative Example 5 | comparative toner 5 | B | 1.43 | C | 1.36 | C | 1.38 | D | 1.31 | D |
| Comparative Example 6 | comparative toner 6 | C | 1.35 | D | 1.21 | D | 1.29 | D | 1.16 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247083, filed Dec. 28, 2018 which is hereby incorporated by reference herein in its entirety.

What is claimed is:

1. A toner, comprising:
a toner particle that contains a binder resin; and
fine particles A at a surface of the toner particle, fine particles A being organosilicon polymer fine particles having a number-average primary particle diameter of 30 to 500 nm, wherein
the organosilicon polymer fine particles have an attachment index for a polycarbonate film of not more than 3.5, where the attachment index=(Area ratio [A] for the organosilicon polymer fine particles transferred to the polycarbonate film)/(Coverage ratio [B] of the surface of the toner particle by the organosilicon polymer fine particles)×100, and
$0.05 \le b/(b+c) \le 0.40$ when an expansion image of the toner is obtained by steps (i) to (iii):
(i) obtaining a cross sectional image of the toner with a transmission electron microscope;
(ii) determining a line along a perimeter of the surface of the toner particle in the cross sectional image; and
(iii) obtaining an expansion image of the cross sectional image by expanding the line determined in step (ii) into a straight line,
in which the organosilicon polymer fine particles penetrate into the toner particle to a penetration depth b (nm), and protrude from the toner particle at a protrusion height c (nm).

2. The toner according to claim 1, wherein the organosilicon polymer fine particles have a number-average primary particle diameter of 50 to 150 nm.

3. The toner according to claim 1, wherein the coverage ratio of the surface of the toner particle by the organosilicon polymer fine particles is 5 to 50%.

4. The toner according to claim 1, wherein the organosilicon polymer fine particle contains a organosilicon polymer having a structure in which the silicon atom and oxygen atom are bonded to each other in alternation and a portion of silicon atoms contained in the organosilicon polymer has a T3 unit structure as represented by $R^1SiO_{3/2}$
where $R^1$ represents an alkyl group having 1 to 6 carbons or a phenyl group.

5. The toner according to claim 4, wherein the storage elastic modulus E' of the toner at 30° C. as obtained by a powder dynamic viscoelastic measurement is at least $1.0 \times 10^8$ Pa, the organosilicon polymer is a condensate of an organosilicon compound having a structure represented by formula (2)

where $R^2$, $R^3$, $R^4$, and $R^5$ independently represent an alkyl group having 1 to 6 carbons, a phenyl group, or a reactive group selected from the group consisting of halogen atoms, a hydroxy group, an acetoxy group and an alkoxy group, with the proviso that at least one of $R^2$, $R^3$, $R^4$, and $R^5$ is the reactive group,
X is at least 0.90 and W+X+Y+Z=1.00 given tetrafunctional silane to designate organosilicon compounds having four reactive groups in each molecule with formula (2), trifunctional silane as organosilicon compounds having said alkyl or phenyl group for $R^2$ and reactive groups for $R^3$, $R^4$ and $R^5$, difunctional silane as organosilicon compounds having said alkyl or phenyl group for $R^2$ and $R^3$ and reactive groups for $R^4$ and $R^5$, or monofunctional silane as organosilicon compounds having said alkyl group or phenyl group for $R^2$, $R^3$ and $R^4$ and one reactive group for $R^5$, when W, X, Y and Z are respectively the numerical proportions of units derived from said tetrafunctional silane, trifunctional silane, difunctional silane and monofunctional silane, and
for the oxygen atoms bonded to the element Si that has taken on a trifunctional structure (T unit structure), T2/T3 for the organosilicon polymer is 0.20 to 0.60 given T1 as the proportion for the structure in which the number of said oxygen atoms bonded to the element Si other than the aforesaid element Si is 1, T2 for the proportion for the structure in which the number of said oxygen atoms bonded to the element Si other than the aforesaid element Si is 2, and T3 for the proportion for the structure in which the number of said oxygen atoms bonded to the element Si other than the aforesaid element Si is 3.

6. The toner according to claim 4, wherein the organosilicon polymer fine particles are polyalkylsilsesquioxane fine particles.

7. The toner according to claim 1, wherein a methanol concentration at a transmittance of 50% is 50 to 70 volume % when the wettability of the organosilicon polymer fine particles with respect to a methanol/water mixed solvent is measured by the transmittance of light at a wavelength of 780 nm.

8. The toner according to claim 1, wherein the organosilicon polymer fine particles have an attachment index of not more than 3.2.

9. The toner according to claim 1, wherein the organosilicon polymer fine particles have an attachment index of not more than 3.0.

10. The toner according to claim 1, wherein $0.09 \leq b/(b+c) \leq 0.37$.

* * * * *